(12) United States Patent  (10) Patent No.: US 9,220,028 B2
Suzuki et al.                    (45) Date of Patent:      Dec. 22, 2015

(54) METHODS AND APPARATUS TO PERFORM MEASUREMENTS

(75) Inventors: Takashi Suzuki, Tokyo (JP); Christopher Harris Snow, Waterloo (CA); Nazih Almalki, Waterloo (CA); Ayman Ahmed Abdel-Samad, Waterloo (CA); Dinesh Kumar Arora, Waterloo (CA); Richard Burbidge, Slough (GB); Gordon Young, Slough (GB); Xusheng Wei, Slough (GB)

(73) Assignee: BlackBerry Limited, Waterloo, Ontario (CA)

( * ) Notice: Subject to any disclaimer, the term of this patent is extended or adjusted under 35 U.S.C. 154(b) by 203 days.

(21) Appl. No.: 12/705,243

(22) Filed: Feb. 12, 2010

(65) Prior Publication Data

US 2011/0201279 A1    Aug. 18, 2011

(51) Int. Cl.
*H04W 24/00* (2009.01)
*H04W 24/10* (2009.01)

(52) U.S. Cl.
CPC .................................. *H04W 24/10* (2013.01)

(58) Field of Classification Search
CPC .................................................... H04W 24/10
USPC ........ 455/67.11, 67.13–17, 68, 423, 226.1–4, 455/115.1–4
See application file for complete search history.

(56) References Cited

U.S. PATENT DOCUMENTS

| | | | |
|---|---|---|---|
| 6,116,005 A | 9/2000 | Chamberlain | |
| 6,119,005 A | 9/2000 | Smolik | |
| 6,219,544 B1 | 4/2001 | Suutarinen | |
| 6,360,098 B1 | 3/2002 | Ganesh et al. | |
| 6,393,279 B1 | 5/2002 | Lee | |
| 6,445,917 B1 * | 9/2002 | Bark et al. | 455/423 |
| 6,636,740 B1 | 10/2003 | Ramesh | |
| 7,092,711 B2 | 8/2006 | Masuda et al. | |
| 7,706,135 B2 | 4/2010 | Sharp et al. | |
| 7,710,930 B2 * | 5/2010 | Kwak | 370/338 |
| 7,929,512 B2 | 4/2011 | Malomsoky et al. | |
| 7,969,939 B2 | 6/2011 | Paul et al. | |
| 7,979,208 B2 | 7/2011 | Wang | |
| 8,121,601 B2 * | 2/2012 | Huang et al. | 455/436 |
| 8,121,602 B2 | 2/2012 | Yi et al. | |

(Continued)

FOREIGN PATENT DOCUMENTS

| | | |
|---|---|---|
| CN | 101212359 | 7/2008 |
| CN | 101222754 | 7/2008 |

(Continued)

OTHER PUBLICATIONS

3rd Generation Partnership Project, "3GPP TS 37.CDE," V0.2.0, Jan. 2010, 7 pages.

(Continued)

*Primary Examiner* — Wen Huang

(74) *Attorney, Agent, or Firm* — Fish & Richardson P.C.

(57) ABSTRACT

Methods and apparatus to perform measurements are disclosed. An example method disclosed herein for a user equipment (UE) to perform measurements in a mobile communication network comprises receiving configuration information comprising at least one of a validity state, a measurement activation criterion, a measurement deactivation criterion, a reporting criterion or a location request criterion to configure a measurement, and performing the measurement based on the configuration information.

48 Claims, 20 Drawing Sheets

(56) References Cited

U.S. PATENT DOCUMENTS

| | | | |
|---|---|---|---|
| 8,155,659 B2 | 4/2012 | Kazmi et al. | |
| 8,185,060 B2 | 5/2012 | Agashe et al. | |
| 8,219,127 B2 | 7/2012 | Lee et al. | |
| 8,391,887 B2 | 3/2013 | Suzuki et al. | |
| 8,553,563 B2 | 10/2013 | Suzuki et al. | |
| 8,571,542 B2 | 10/2013 | Wu | |
| 8,611,896 B2 | 12/2013 | Nader et al. | |
| 2003/0190916 A1 | 10/2003 | Celedon et al. | |
| 2004/0032845 A1 | 2/2004 | Chen | |
| 2005/0042987 A1* | 2/2005 | Lee et al. | 455/67.11 |
| 2006/0128371 A1 | 6/2006 | Dillon et al. | |
| 2006/0264179 A1* | 11/2006 | Bonneville et al. | 455/67.11 |
| 2008/0051998 A1 | 2/2008 | Wang | |
| 2008/0108374 A1 | 5/2008 | Xiong et al. | |
| 2008/0132225 A1 | 6/2008 | Ranta et al. | |
| 2008/0188216 A1 | 8/2008 | Kuo et al. | |
| 2008/0220784 A1 | 9/2008 | Somasundaram et al. | |
| 2009/0059871 A1 | 3/2009 | Nader et al. | |
| 2009/0239535 A1 | 9/2009 | Chun et al. | |
| 2009/0291692 A1 | 11/2009 | Kazmi et al. | |
| 2010/0041412 A1* | 2/2010 | Yu | 455/450 |
| 2010/0052985 A1 | 3/2010 | Hung et al. | |
| 2010/0081438 A1 | 4/2010 | Callender et al. | |
| 2010/0105377 A1 | 4/2010 | Iwamura et al. | |
| 2010/0190488 A1* | 7/2010 | Jung et al. | 455/424 |
| 2010/0208604 A1 | 8/2010 | Kazmi et al. | |
| 2010/0208707 A1 | 8/2010 | Hamabe et al. | |
| 2010/0273472 A1 | 10/2010 | Drewes et al. | |
| 2010/0323683 A1 | 12/2010 | Kazmi et al. | |
| 2010/0323719 A1 | 12/2010 | Jen | |
| 2010/0325267 A1 | 12/2010 | Mishra et al. | |
| 2010/0330921 A1 | 12/2010 | Kim et al. | |
| 2011/0081868 A1* | 4/2011 | Kim et al. | 455/67.11 |
| 2011/0183661 A1 | 7/2011 | Yi et al. | |
| 2011/0194441 A1 | 8/2011 | Jung et al. | |
| 2011/0276838 A1 | 11/2011 | Zhou et al. | |
| 2012/0008506 A1 | 1/2012 | Astigarraga et al. | |
| 2012/0039189 A1 | 2/2012 | Suzuki et al. | |
| 2012/0039365 A1 | 2/2012 | Suzuki et al. | |
| 2012/0044822 A1 | 2/2012 | Kim et al. | |
| 2012/0309404 A1 | 12/2012 | Suzuki et al. | |
| 2012/0315890 A1 | 12/2012 | Suzuki et al. | |
| 2013/0022026 A1 | 1/2013 | Ishii et al. | |
| 2013/0159714 A1 | 6/2013 | Prestidge et al. | |
| 2014/0004847 A1 | 1/2014 | Suzuki et al. | |

FOREIGN PATENT DOCUMENTS

| | | |
|---|---|---|
| CN | 101406085 | 4/2009 |
| CN | 101420711 A | 4/2009 |
| CN | 102845093 | 12/2012 |
| CN | 102860062 | 1/2013 |
| CN | 102860063 | 1/2013 |
| EP | 22360961 A2 | 8/2011 |
| EP | 2360961 A3 | 11/2011 |
| EP | 2523497 | 11/2012 |
| EP | 2534868 | 12/2012 |
| EP | 2534869 | 12/2012 |
| JP | 2002303665 | 10/2002 |
| JP | 2008053944 | 3/2008 |
| TW | 524982 | 3/2003 |
| WO | 0070897 | 11/2000 |
| WO | WO 02082120 | 10/2002 |
| WO | 2006063309 | 6/2006 |
| WO | 2008083618 | 7/2008 |
| WO | 2008084662 | 7/2008 |
| WO | 2009022835 A2 | 2/2009 |
| WO | 2009056028 | 5/2009 |
| WO | 2009057960 | 5/2009 |
| WO | WO 2010032775 | 3/2010 |
| WO | WO 2011083802 | 7/2011 |
| WO | 2011097728 | 8/2011 |
| WO | 2011097729 | 8/2011 |
| WO | WO 2011099634 | 8/2011 |
| WO | WO 2012021614 | 2/2012 |

OTHER PUBLICATIONS

3rd Generation Partnership Project, "3GPP TS 36.304," V8.7.0, Sep. 2009, 30 pages.

3rd Generation Partnership Project, "3GPP TR 36.805," V2.0.0, Dec. 2009, 23 pages.

3GPP TSG-RAN WG2 (Telecom Italia), "Preliminary Analysis on Use Cases and UE Measurements for Minimisation of Drive Tests," Mar. 23-27, 2009, Seoul, Korea, 4 pages.

3GPP TSG-RAN WG2 (Huawei), "Measurements for Minimization of Drive Tests," Jun. 29-Jul. 3, 2009, Los Angeles, CA, 3 pages.

3GPP TSG-RAN WG2 (Qualcomm Europe), "Email Discussion Summary [66b#7] LTE-UMTS: Minimisation of Drive Tests," Aug. 24-28, 2009, Shenzhen, China, 35 pages.

3GPP TSG-RAN WG2 (Nokia Corporation, Nokia Siemens Networks), "Location Information for Minimization of Drive Test," Oct. 12-16, 2009, Miyazaki, Japan, 3 pages.

3GPP TSG-RAN WG2 (Ericsson, ST-Ericsson), "Discussion on Architecture for MDT," Oct. 12-16, 2009, Miyazaki, Japan, 3 pages.

3GPP TSG-RAN2 (NTT DOCOMO, Inc.), "Common Pilot Measurements for MDT," Oct. 12-16, 2009, Miyazaki, Japan, 4 pages.

3GPP TSG-RAN WG2 (Orange, Telecom Italia, Deutsche Telekom), "MDT Measurement Model," Jan. 18-22, 2010, Valencia, Spain, 3 pages.

3GPP TSG-RAN WG2 (Motorola), "Configuration of UE Measurements for MDT in Idle Mode," Jan. 18-22, 2010, Valencia, Spain, 2 pages.

3GPP TSG RAN (Nokia Siemens Networks, Nokia), "New Work Item Proposal: Minimization of Drive Tests for E-UTRAN and UTRAN," Dec. 1-4, 2009, Sanya, P.R. China, 6 pages.

3GPP TSG RAN (Nokia Siemens Networks, Nokia), "New Work Item Proposal: Minimization of drive tests for E-UTRAN and UTRAN," Dec. 1-4, 2009, Sanya, P.R. China, 5 pages.

International Searching Authority, "Search Report," issued in connection with corresponding PCT Application No. PCT/CA2011/050078, mailed on Mar. 17, 2011, (3 pages).

International Searching Authority, "Written Opinion," issued in connection with corresponding PCT Application No. PCT/CA2011/050078, mailed on Mar. 17, 2011, (4 pages).

International Searching Authority, "Search Report," issued in connection with corresponding PCT Application No. PCT/CA2011/050079, mailed on Mar. 14, 2011, (3 pages).

International Searching Authority, "Written Opinion," issued in connection with corresponding PCT Application No. PCT/CA2011/050079, mailed on Mar. 14, 2011, (4 pages).

International Searching Authority, "Search Report," issued in connection with corresponding PCT Application No. PCT/CA2011/050080, mailed on Apr. 29, 2011, (3 pages).

International Searching Authority, "Written Opinion" issued in connection with corresponding PCT Application No. PCT/CA2011/050080, mailed on Apr. 29, 2011, (4 pages).

European Patent Office, "Extended European Search Report," issued in connection with corresponding EP Patent Application No. 11154233.8, issued Oct. 13, 2011 (9 pages).

European Patent Office, "Extended European Search Report," issued in connection with corresponding EP Patent Application No. 11154230.4, issued Oct. 13, 2011 (9 pages).

European Patent Office, "Extended European Search Report," issued in connection with corresponding EP Patent Application No. 11154236.1, issued Oct. 13, 2011 (8 pages).

3GPP TR 36.805, "Technical Specification Group Radio Access Network; Study on Minimization of drive-tests in Next Generation Networks; (Release 9)," Version 2.0.0, Nov. 2009 (24 pages).

3GPP TSG-RAN WG2 #68 (Huawei), "Consideration on CP Solution of Minimization of Drive Test," Nov. 9-13, 2009, Jeju, Korea (4 pages).

3GPP TSG-RAN WG2 #68 (Nokia Siemens Networks, Nokia Corporation), "Architectures Comparison," Nov. 9-13, 2009, Jeju, Korea (8 pages).

(56) References Cited

OTHER PUBLICATIONS

3GPP TSG-RAN WG2 #68bis (CATT), "Consideration on Priority of MDT Report," Jan. 18-22, 2010, Valencia, Spain (2 pages).
3GPP TSG-RAN WG2 #68bis (Nokia Siemens Networks, Nokia Corporation), "UE-Originated RLF report for SON," Jan. 18-22, 2010, Valencia, Spain (4 pages).
EPO "Communication pursuant to Rules 161(1) and 162 EPC," issued in connection with European Patent Application No. 11741796.4, dated Sep. 21, 2012 (2 pages).
EPO "Communication pursuant to Rules 161(1) and 162 EPC," issued in connection with European Patent Application No. 11741797.2, dated Sep. 21, 2012 (2 pages).
PCT, "International Preliminary Report on Patentability (IPRP)," issued in connection with International Application No. PCT/CA2011/050078, dated Aug. 14, 2012 (5 pages).
PCT, "International Preliminary Report on Patentability (IPRP)," issued in connection with International Application No. PCT/CA2011/050079, dated Aug. 14, 2012 (5 pages).
PCT, "International Preliminary Report on Patentability (IPRP)," issued in connection with International Application No. PCT/CA2011/050080, dated Aug. 14, 2012 (5 pages).
USPTO, "Office Action," issued in connection with U.S. Appl. No. 13/578,562, dated Nov. 24, 2012 (9 pages).
USPTO, "Office Action," issued in connection with U.S. Appl. No. 13/578,565, dated Jan. 22, 2013 (20 pages).
United States Patent and Trademark Office, "Office Action," issued in connection with corresponding U.S. Appl. No. 13/578,562, on Jul. 17, 2013, 10 pages.
United States Patent and Trademark Office, "Office Action," issued in connection with corresponding U.S. Appl. No. 13/578,562, on Oct. 28, 2013, 18 pages.
United States Patent and Trademark Office, "Advisory Action," issued in connection with corresponding U.S. Appl. No. 13/578,562, on Oct. 1, 2013, 3 pages.
European Patent Office, "Extended European Search Report," issued in connection with European Application No. 11741796.4, dated Jun. 5, 2013, 10 pages.
European Patent Office, "Extended European Search Report," issued in connection with European Application No. 11741797.2, dated Jun. 10, 2013, 9 pages.
United States Patent and Trademark Office, "Final Office Action", issued in connection with corresponding U.S. Appl. No. 13/578,562, dated May 19, 2014 (10 pages).
Chinese Intellectual Property Office, "Office Action", issued in connection with Chinese Patent Application No. 201180018747.4, dated Aug. 4, 2014 (8 pages).
Canadian Intellectual Property Office, "Office Action", issued in connection with Canadian Patent Application No. 2,789,501, dated Jul. 15, 2014 (2 pages).
Canadian Intellectual Property Office, "Office Action", issued in connection with Canadian Patent Application No. 2,789,504, dated Jul. 22, 2014 (3 pages).
Canadian Intellectual Property Office, "Office Action", issued in connection with Canadian Patent Application No. 2,789,499, dated Jul. 15, 2014 (2 pages).
Chinese Intellectual Property Office, "Office Action", issued in connection with Chinese Patent Application No. 201180018810.4, dated Aug. 19, 2014 (19 pages).
Canadian Office Action in Canadian Application No. 2,808,068, dated Jan. 23, 2015, 3 pages.
Chinese Office Action in Chinese Application No. 201180049175.6, dated Jan. 30, 2015, 6 pages.
3GPP TR 36.805, "Technical Specification Group Radio Access Network; Study on Minimization of drive-tests in Next Generation Networks; (Release 9)," Version 9.0.0, Dec. 2009, 24 pages.
USPTO, "Office Action," issued in connection with U.S. Appl. No. 13/578,562, dated Jan. 26, 2015 (38 pages).
"3rd Generation Partnership Project; Technical Specification Group Radio Access Network; Universal Mobile Telecommunications System (UMTS); LTE; Universal Terrestrial Radio Access (UTRA) and Evolved Universal Terrestrial Radio Access (E-UTRA); Radio Measurement Collection for Minimization of Drive Tests (MDT); Overall Description; Stage 2 (Release 10)," 3GPP TS 37.320 V10.2.0, Jul. 2011 (19 pages).
"3rd Generation Partnership Project; Technical Specification Group Radio Access Network; Universal Terrestrial Radio Access (UTRA) and Evolved Universal Terrestrial Radio Access (E-UTRA); Radio Measurement Collection for Minimization of Drive Tests (MDT); Overall Description; Stage 2 (Release 10)," 3GPP TS 37.320 V0.7.0, Jun. 2010 (14 pages).
"3rd Generation Partnership Project; Technical Specification Group Radio Access Network; User Equipment (UE) procedures in idle mode and procedures for cell reselection in connected mode (Release 8)," 3GPP TS 25.304 V8.10.0, Jun. 2010, (50 pages).
"3rd Generation Partnership Project; Technical Specification Group Tsg Ran; Universal Terrestrial Radio Access (UTRA) and Evolved Universal Terrestrial Radio Access (E-UTRA); Radio measurement collection for Minimization of Drive Tests (MDT); Overall description; Stage 2; (Release 10)," Jun. 2010, (15 pages).
"Support of UE-originated RLFreporting for Mobility Robustness SON use case," Change Request 36.331, CR 0401, rev 3, Current Version: 9.1.0, 3GPP TSG-WG2 Meeting #69, San Francisco, USA, Feb. 22- 26, 2010, (7 pages).
ETSI MCC, "Report of 3GPP TSG RAN WG2 Meeting #71bis, held in Xi'an, China, Oct. 11-15, 2010," Document for Approval, Agenda Item: 2.2, 3GPP TSG-RAN Working Group 2 Meeting #72; Jacksonville, USA, Nov. 15-19, 2010 (144 pages).
NIT DOCOMO, INC. "Positioning session as trigger for MDT measurement collection," Document for Discussion and Approval, Agenda Item: 4.3.1.3 (4.3.1.2), 3GPP TSG-RAN2#70bis; Stockholm, Sweden, Jun. 28-Jul. 2, 2010 (4 pages).
Research in Motion UK Limited, "Reporting of Neighbour Cell in Logged MDT," Document for Discussion and Decision, Agenda Item: 4.3.1.3, 3GPP TSG-RAN WG2 Meeting #71bis; Xi'an, China, Oct. 11-15, 2010 (3 pages).
Surveylab, "GPS TIFF and startup modes," downloaded from http://www.ikegps.com/ on Aug. 13, 2010 (3 pages).
International Searching Authority, "International Preliminary Report on Patentability", issued in connection with International Application No. PCT/US2011/047243, dated Feb. 19, 2013 (6 pages).
International Searching Authority, "International Preliminary Report on Patentability", issued in connection with International Application No. PCT/US2011/047244, dated Feb. 19, 2013 (8 pages).
International Searching Authority, "International Search Report and Written Opinion," issued in connection with corresponding PCT Application No. PCT/US2011/047243, issued on Dec. 2, 2011 (12 pages).
International Searching Authority, "International Search Report and Written Opinion," issued in connection with corresponding PCT Application No. PCT/US2011/047244, issued on Nov. 16, 2011 (14 pages).
IP Australia, "Examination Report", issued in connection with Australian Patent Application No. 2011289488, dated Dec. 16, 2013 (3 pages).
IP Australia, "Examination Report", issued in connection with Australian Patent Application No. 2011289489, dated Dec. 16, 2013 (4 pages).
IP Australia, "Notice of Acceptance", issued in connection with Australian Patent Application No. 2011289488, dated Oct. 3, 2014 (2 pages).
IP Australia, "Notice of Acceptance", issued in connection with Australian Patent Application No. 2011289489, dated Dec. 1, 2014 (2 pages).
Canadian Intellectual Property Office, "Office Action", issued in connection with Canadian Patent Application No. 2,808,070, dated Feb. 4, 2014 (4 pages).
Chinese Intellectual Property Office, "Office Action", issued in connection with Chinese Patent Application No. 201180049175.6, dated May 15, 2014 (11 pages).
European Patent Office, "Communication pursuant to Article 94(3) EPC", issued in connection with European Patent Application No. 11748834.6, dated Dec. 17, 2013 (6 pages).

(56) References Cited

OTHER PUBLICATIONS

Korean Intellectual Property Office, "Office Action", issued in connection with Korean Patent Application No. 10-2013-7006436, dated Jun. 3, 2014 (4 pages).

Korean Intellectual Property Office, "Office Action", issued in connection with Korean Patent Application No. 10-2013-7006435, dated Mar. 3, 2014 (4 pages).

Korean Intellectual Property Office, "Notice of Allowance", issued in connection with Korean Patent Application No. 10-2013-7006435, dated Sep. 29, 2014 (3 pages).

Korean Intellectual Property Office, "Office Action", issued in connection with Korean Patent Application No. 10-2013-7006436, dated Dec. 3, 2014 (3 pages).

Japanese Patent Office, "Office Action", issued in connection with Japanese Patent Application No. 2013-524199, dated Feb. 3, 2014 (3 pages).

Japanese Patent Office, "Notice of Allowance", issued in connection with Japanese Patent Application No. 2013-524199, dated Sep. 16, 2014 (3 pages).

Japanese Patent Office, "Notice of Allowance", issued in connection with Japanese Patent Application No. 2013-524200, dated Sep. 16, 2014 (3 pages).

Japanese Patent Office, "Office Action", issued in connection with Japanese Patent Application No. 2013-524200, dated Feb. 5, 2014 (7 pages).

Mexican Patent Office, "Office Action", issued in connection with Mexican Patent Application No. MX/a/2013/001689, dated Apr. 7, 2014 (5 pages).

Mexican Patent Office, "Office Action", issued in connection with Mexican Patent Application No. MX/a/2013/001689, dated Jul. 21, 2014 (6 pages).

Mexican Patent Office, "Office Action", issued in connection with Mexican Patent Application No. MX/a/2013/001690, dated Sep. 23, 2013 (5 pages).

Mexican Patent Office, "Notice of Allowance", issued in connection with Mexican Patent Application No. MX/a/2013/001690, dated Feb. 17, 2014 (1 page).

Mexican Patent Office, "Notice of Allowance", issued in connection with Mexican Patent Application No. MX/a/2013/001689, dated Oct. 17, 2014 (1 page).

United States Patent and Trademark Office, "Non-Final Office Action", issued in connection with U.S. Appl. No. 12/856,344, dated Jul. 20, 2012 (9 pages).

United States Patent and Trademark Office, "Non-Final Office Action", issued in connection with U.S. Appl. No. 12/856,344, dated Nov. 9, 2012 (10 pages).

United States Patent and Trademark Office, "Non-Final Office Action", issued in connection with U.S. Appl. No. 14/020,589, dated Jul. 17, 2014 (23 pages).

United States Patent and Trademark Office, Notice of Allowance, issued in connection with U.S. Appl. No. 12/856,344, dated May 14, 2013 (15 pages).

United States Patent and Trademark Office, Notice of Allowance, issued in connection with U.S. Appl. No. 12/856,355, dated Oct. 29, 2012 (7 pages).

United States Patent and Trademark Office, "Notice of Allowance," issued in connection with U.S. Appl. No. 12/856,355, on Jul. 12, 2012 (7 pages).

United States Patent and Trademark Office, "Office Action," issued in connection with U.S. Appl. No. 12/856,355, on Jan. 30, 2012 (10 pages).

State Intellectual Property Office of People'S Republic of China, "First Office Action", issued in connection with Chinese Patent Application No. 201180018733.2, dated Aug. 20, 2014 (27 pages).

* cited by examiner

METHODS AND APPARATUS TO PERFORM MEASUREMENTS

FIELD OF THE DISCLOSURE

This disclosure relates generally to measurement reporting and, more particularly, to methods and apparatus to perform measurements.

BACKGROUND

Currently, mobile communication network operators perform drive tests, often continuously or at least frequently, to collect network performance metrics. Recently, the Third Generation Partnership Project (3GPP) has begun investigating a minimization of drive test (MDT) framework in which at least some drive test measurements can be collected from commercial user equipment (UE) operating in the network, instead of requiring dedicated drive tests. Through the use of the MDT framework, the need for and number of rigorous drive tests can be reduced, which can significantly decrease network maintenance costs for operators and also decrease carbon emissions, thereby helping to protect the environment. Additionally, by reducing reliance on separate drive tests, faster optimization cycles can be achieved, thereby resulting in higher customer satisfaction. Furthermore, the MDT framework will enable operators to collect measurements from areas that are typically not accessed during drive tests (e.g. such as narrow roads, forests, private land, homes and office, etc.).

DETAILED DESCRIPTION

Figure 1:
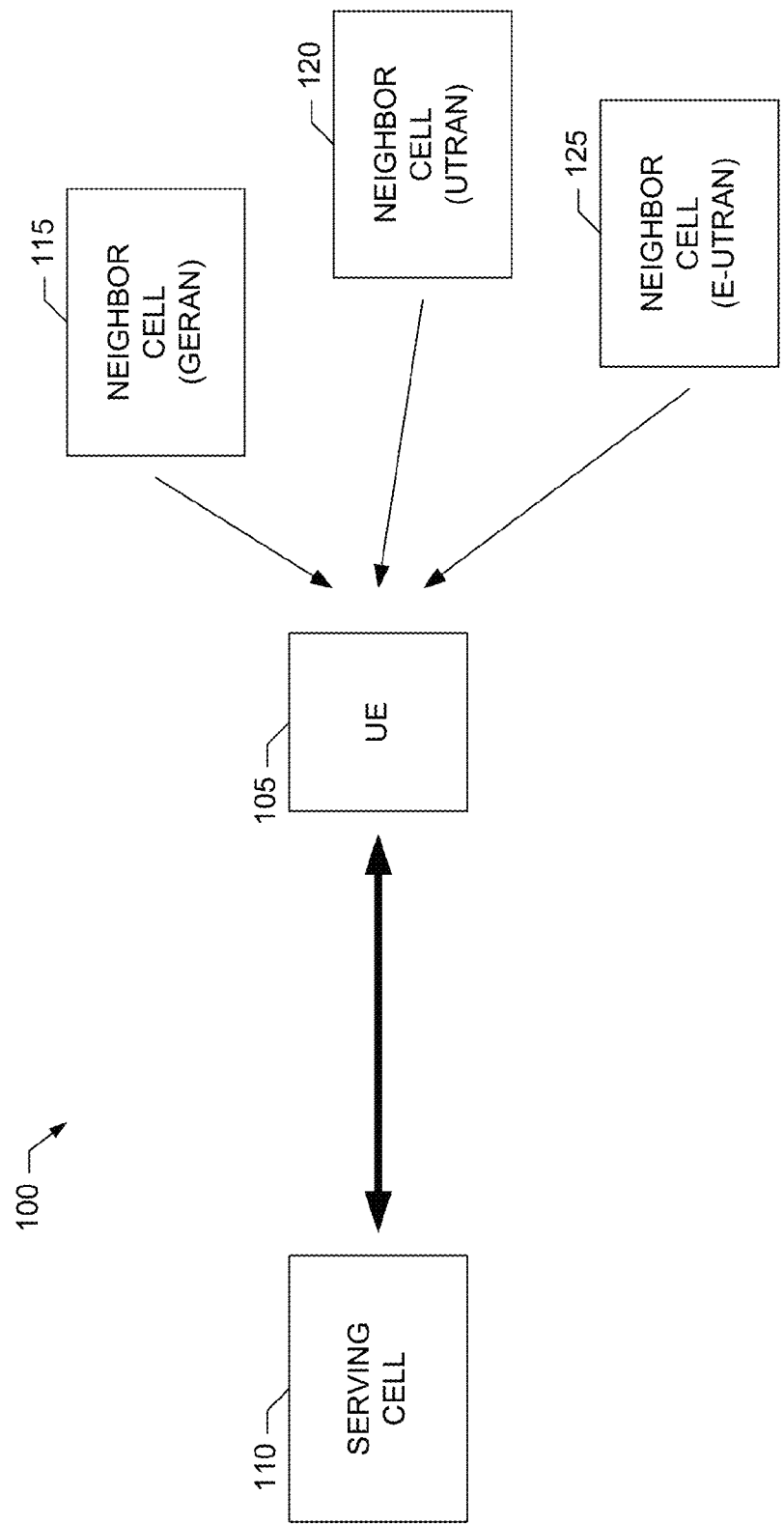
FIG. 1 is a block diagram of an example 3GPP communication system capable of supporting the methods and apparatus described herein to perform MDT measurements.

Methods and apparatus to perform measurements for minimization of drive tests in next generation networks are disclosed herein. Although the following discloses example methods and apparatus including, among other components, software executed on hardware, it should be noted that such methods and apparatus are merely illustrative and should not be considered as limiting. For example, it is contemplated that any or all of these hardware and software components could be implemented exclusively in hardware, exclusively in software, exclusively in firmware, or in any combination of hardware, software, and/or firmware. Additionally, though described in connection with example implementations using next generation mobile communication networks, access points and other network structures and devices, the example methods and apparatus described herein are not limited thereto. Accordingly, while the following describes example methods and apparatus, persons having ordinary skill in the art will readily appreciate that the examples provided are not the only way to implement such methods and apparatus.

The example methods and apparatus described herein can be used to implement various techniques for performing MDT measurements, as well as for performing MDT positioning measurements (also referred to as MDT location measurements) to determine positioning (location) information for inclusion or association with other MDT measurements. At a high level, the example techniques employed herein involve a network element configuring a UE operating in the communication network to perform MDT measurements, which are generally separate from conventional measurements performed by the UE to support conventional network operation, to enable the network to ascertain network performance and detect potential problem areas without requiring separate drive tests. Examples of MDT configuration information provided by the network to the UE include, but are not limited to, MDT measurement activation and deactivation criteria, MDT reporting criteria, MDT location request criteria, etc., examples of which are described in greater detail below. Upon receiving the MDT configuration information, a UE implemented according to one or more of the example methods and apparatus described herein can perform MDT measurements and determine its position/location as configured by the received MDT configuration information. Furthermore, the example methods and apparatus described herein enable a commercial (e.g., user or subscriber owned) UE to perform MDT measurements, in contrast to requiring test equipment UEs or other special-purpose UEs to perform MDT measurements in the communication network.

In an example technique disclosed herein for performing MDT measurements, such as periodic downlink pilot measurements, in a next-generation mobile communication network, a commercial UE obtains an activation condition and a deactivation condition for an MDT measurement from configuration information received from a network element to configure the MDT measurement. The commercial UE then performs the MDT measurement based on the activation condition and the deactivation condition. In an associated example technique disclosed herein to configure MDT measurements, such as periodic downlink pilot measurements, a network element includes an activation condition and a deactivation condition for an MDT measurement in configuration information to be sent to a commercial UE to configure the MDT measurement. As described in detail below, examples of activation conditions include, but are not limited to, a threshold, an access class, a positioning capability, a measurement probability factor, etc. As also described in detail below, examples of deactivation conditions include, but are not limited to, a threshold, a duration, etc. In at least some example implementations, the MDT configuration information can include one or more reporting criteria to condition whether the commercial UE is to report determined MDT measurements to the network. As described in greater detail below, examples of such MDT reporting criteria include, but are not limited to, an event identity (such as out of coverage, limited camping, paging channel (PCH) failure, broadcast control channel (BCCH) failure, etc.) and other triggering conditions, such as a reporting probability factor, a reporting range (e.g., such as a required outage duration range), etc.

In at least some operating scenarios, a commercial UE may be configured to determine its position (or location) for MDT purposes in addition to, or as an alternative to, performing other MDT measurements. In an example technique disclosed herein for performing MDT positioning measurements (also referred to as location measurements), a commercial UE obtains a deactivation condition (e.g., such as a duration, a threshold, or both) for an MDT positioning measurement from configuration information received from a network element to configure the MDT positioning measurement. The MDT positioning measurement is then activated in the commercial UE based on an activation threshold, with the UE terminating the MDT positioning measurement based on the deactivation condition. In an associated example implementation on the network side, the network element includes the deactivation condition for the MDT positioning measurement in configuration information to be sent to the commercial UE to configure the MDT positioning measurement, sends the configuration information, and then causes the MDT positioning measurement to be activated in the commercial UE (e.g., by sending an appropriate control message) based on an activation threshold.

In another example technique disclosed herein for performing MDT positioning measurements, a commercial UE obtains configuration information from a network element to configure an MDT positioning measurement, with the configuration information including an indication that the commercial UE is to request positioning assistance data if a radio condition degrades below a threshold. At a later time, the UE requests positioning assistance data when the radio condition degrades below the threshold. In an associated example implementation on the network side, the network element includes an indication in configuration information to be sent to the commercial UE to configure the MDT positioning measurement, with the indication indicating that the UE is to request positioning assistance data if a radio condition degrades below a threshold. After sending the configuration information, at a later time the network sends the positioning assistance data to the UE in response to receiving a request for positioning assistance data from the UE (e.g., sent by the UE when the radio condition degrades below the threshold).

In yet another example technique disclosed herein for performing MDT positioning measurements, a commercial UE obtains configuration information from a network element to configure an MDT positioning measurement, with the configuration information including an indication that the commercial UE is to perform or request the MDT positioning measurement upon returning to a coverage area. The commercial UE then initiates the MDT positioning measurement when the UE returns to the coverage area (e.g., which may be detected by the UE as a suitable cell being found, a recovery from a BCCH failure, a recovery from a random access channel (RACH) failure, etc). In an associated example implementation on the network side, the network element includes an indication in configuration information to be sent to the commercial UE to configure the MDT positioning measurement, with the indication indicating that the UE is to perform the MDT positioning measurement upon returning to a coverage area. The network element then sends the configuration information for receipt by the commercial UE.

Various MDT measurements to be performed by commercial UEs in the MDT measurement framework have been proposed. Examples of such proposed MDT measurements include a periodic downlink pilot measurement, a serving cell becomes worse than threshold measurement, a transmit power headroom becomes less than threshold measurement, a random access failure measurement, and a radio link failure report. Although each such proposed measurement is to include location information to enable a network to determine where the measurement was performed, the techniques for determining such location information without unduly impacting the UE's battery life, using radio communication resources, incurring core network delays, etc., or any combination thereof, are still to be defined. In contrast to the proposals, the example methods and apparatus disclosed herein implement location determination techniques having specified activation, deactivation and other operating conditions that reduce the impact on UE battery life, reduce the use of radio communication resources and limit the need to access the core network.

Additionally, the existing proposed measurements, such as the serving cell becomes worse than threshold measurement, are inadequate for capturing many network problem scenarios, such as ping-ponging between cells, or require substantial amounts of logging (and the associated impact on UE memory) to obtain sufficient data to characterize the problem scenario, or both. In contrast, the example methods and apparatus disclosed herein modify the configuration and performance of, for example, periodic downlink pilot measurements by specifying activation, deactivation and other operating conditions to enable efficient capturing of at least some of these network problem scenarios.

In at least some example implementations, the methods and apparatus employed herein employ information elements (IEs) that are signaled from the network to a UE to configure MDT measurement and logging/reporting. Broadly, these MDT IEs can be divided into at least the following three groups: (1) measurement activation and deactivation criteria; (2) reporting criteria; and (3) location request criteria. In conventional 3GPP systems, measurement requests are applicable only for a UE in connected mode, and the UE is generally required to perform a particular measurement upon receipt of the associated measurement request from the network. In contrast, the MDT measurement activation and deactivation criteria employed herein can be used to delay performance of particular MDT measurements until the UE is likely to be experiencing a condition of interest to the network (e.g., such as an out of coverage condition). For example, MDT measurements can be activated if any one or more of the configured activation criteria are satisfied or, alternatively, MDT measurement activation may require that all activation criteria are satisfied. Additionally, the activation and deactivation criteria employed herein allow a UE to be configured for MDT measurements while in connected mode, but to actually perform the MDT measurements in idle mode based on any, some or all of the configured activation, the deactivation criteria or one or more valid state indications provided by the network to indicate in which state (e.g., such as idle mode) MDT measurements are to be performed by the UE. Examples of the MDT measurement activation and deactivation criteria employed herein are illustrated by the IEs includes in section 2 of Table 1, which is described in greater detail below.

With respect to the measurement reporting criteria, in conventional 3GPP systems any measurement reporting criteria is generally applicable only for UEs in connected mode, and the UE is generally required to perform reporting based on the reporting criteria immediately upon receipt of the reporting criteria from the network. In contrast, the MDT reporting criteria employed herein is applicable for UEs in both connected mode and idle mode, and include reporting criteria not present in conventional 3GPP systems. Examples of the MDT reporting criteria employed herein are illustrated by the IEs includes in section 3 of Table 1, which is described in greater detail below. With respect to the MDT location request criteria employed herein, such criteria, which is not present in conventional 3GPP systems, enables efficient identification of issues experienced by UEs in the network that are relevant to MDT applications. Examples of the MDT location request criteria employed herein are illustrated by the IEs includes in section 4 of Table 1, which is described in greater detail below. In at least some example implementations, the MDT reporting criteria, the MDT location request criteria, and the MDT measurement activation and deactivation criteria can be configured separately and independently.

Turning to the figures, a block diagram of an example next-generation 3GPP communication system 100 capable of supporting the MDT measurement techniques described herein is illustrated in FIG. 1. The communication system 100 includes an example UE 105 served by an example current (or home or serving) cell 110 implemented by a network element providing base station functionality, such as a node-B in a universal terrestrial radio access network (UTRAN) implementation, an evolved node-B (eNB) in an evolved UTRAN (E-UTRAN) long term evolution (LTE) implementation, etc. Additionally, the communication system 100 includes example cells 115, 120 and 125, which are neighbor cells of the current cell 110. In the illustrated example, the neighbor cells 115, 120 and 125 are implemented by one or more network elements different from the network element implementing the current cell 110. As described in greater detail below, the mobile station 105 and the network element implementing the current cell 110 are capable of performing the example techniques described herein to configure and perform MDT measurements.

In the communication system 100, the UE 105 may correspond to any type of commercial mobile station or user endpoint equipment, such as a mobile telephone device, a fixed telephone device, a personal digital assistant (PDA), a smartphone (e.g., such as BlackBerry® smartphone), etc. Each of the cells 110-125 may correspond to any type of cell, such as a GERAN cell, a UTRAN cell, an E-UTRAN cell, etc. (where GERAN refers to GSM/EDGE radio access network, GSM refers to global system for mobile communications, and EDGE refers to enhanced data rates for GSM evolution). Moreover, some or all of the cells 110-125 may be the same or different types of cells. For example, in FIG. 1 the neighbor cell 115 is a GERAN cell, the neighbor cell 120 is a UTRAN cell and the neighbor cell 125 is an E-UTRAN cell. Also, although each of the cells 110-125 is depicted as being implemented by a separate network element providing base station functionality, some or all of the cells 115-125 may be implemented by a common network element. Furthermore, although only one UE 105 and four (4) cells 110-125 are illustrated in FIG. 1, the 3GPP communication system 100 can support any number of UEs 105 and cells 110-125.

In the illustrated example of FIG. 1, the UE 105 performs one or more MDT measurements as configured by the network element implementing the current cell 110. Examples of such MDT measurements include, but are not limited to, a periodic downlink pilot measurement, a serving cell becomes worse than threshold measurement, a transmit power headroom becomes less than threshold measurement, a random access failure measurement, and a radio link failure report, which are described in 3GPP Technical Report (TR) 36.805, V2.0.0 (December 2009), which is hereby incorporated by reference in its entirety. Briefly, for the periodic downlink pilot measurement, radio environment measurements, such as Common Pilot Channel (CPICH) Received Signal Code Power (RSCP), CPICH Ec/No, Time Division Duplex (TDD) Primary Common Control Physical Channel (P-CCPCH) RSCP and Interference Signal Code Power (ISCP), Reference Signal Received Power (RSRP) and Reference Signal Received Quality (RSRQ) (e.g., in connected mode only) are logged periodically in connected mode, idle mode, or both. For the serving cell becomes worse than threshold measurement, radio environment measurements, such as those mentioned above, are logged when a measured serving cell metric becomes worse than the configured threshold. A measurement logging window (e.g., such as a "sliding window" in which collected logs are kept in the UE) is used to collect information during a certain period before and after the occurrence of event. For the transmit power headroom becomes less than threshold measurement, transmit power headroom and radio environment measurements, such as those mentioned above, are logged when UE transmit power headroom becomes less than the configured threshold. For the random access failure measurement, details on the random access and radio environment measurements, such as those mentioned above, are logged when a random access failure occurs. For the radio link failure report, radio environment measurements, such as those mentioned above, are reported when a radio link failure (RLF) occurs.

In an example implementation, periodic downlink pilot (PDP) measurements can be used to plot downlink reception levels in the 3GPP communication system 100 by, for example, randomly configuring UEs (e.g., including the UE 105) to perform PDP measurements in a certain geographic area regardless of the received signal strength or quality. For the identification of specific coverage holes, the PDP measurement is activated in UEs (e.g., including the UE 105) if the received signal strength or quality becomes worse than one or more thresholds. Otherwise, UE battery and storage space may be wasted for measurements in good radio conditions, which are not useful for identifying coverage holes. Other types of measurements, such as serving cell becomes worse than threshold and transmit power headroom becomes less than threshold, can also utilize activation thresholds.

In connected mode, a radio resource control (RRC) connection exists and the network can select a target UE, such as the UE 105, and configure MDT measurements using RRC messages, such as measurement control or reconfiguration messages. With regard to PDP measurements, such configurations can remain valid after the RRC connection is released depending on, for example, one or more valid state indications provided by the network to indicate in which state(s) MDT measurements can be performed. In idle mode, configuration information for MDT measurements can be sent as part of the broadcast system information. In either connected mode or idle mode, the MDT configuration information includes one or more criteria or conditions that the UE 105 evaluates before activating the measurement so that only certain groups of UEs perform measurements for MDT in the 3GPP communication system 100. Such activation conditions include, for example, access classes, positioning capabilities, measurement probability factors, etc. With respect to the positioning capabilities, the network may want to use certain positioning technologies, such as global navigation satellite system (GNSS) positioning, to position the UE 105 when it encounters coverage problems. With respect to the measurement probability factor, in an example implementation, the UE 105 does not perform the associated MDT measurements if a random number the UE 105 draws is less than (or, alternatively, greater than) the probability factor. With respect to access classes, the network can restrict MDT measurements to be performed by only those UEs belong to particular specified access classes. In an example implementation, MDT measurement and logging is activated when all activation conditions are met. In another example implementation, MDT measurement and logging is activated when any activation condition or a particular subset of the activation conditions are met.

As such, and as described in greater detail below, MDT measurement configuration in the 3GPP communication system 100 can include activation conditions, such as thresholds, access classes, positioning capabilities, measurement probability factor, etc.

Additionally, for identifying coverage holes in the 3GPP communication system 100, the PDP measurements or the serving cell becomes worse than threshold measurements can be configured with deactivation thresholds. For example, if so configured, the UE 105 starts MDT measurements and logging if its received signal strength or quality becomes worse than the configured activation thresholds. However, poor radio conditions may be maintained for a long time or, alternatively, may improve during measurement such that the UE 105 may not experience a coverage problem. Therefore, in the 3GPP communication system 100, the MDT measurement can be terminated in such situations to save UE battery power and storage space. For example, in the 3GPP communication system 100, one or more deactivation conditions are included in at least some MDT measurement configurations. In an example MDT measurement configuration, the deactivation conditions include a measurement duration and a signal level or quality threshold. Furthermore, in an example implementation, MDT measurement and logging is deactivated if at least one of the deactivation conditions is met. If the measurement duration is passed or the radio condition crosses the indicated thresholds, the UE 105 stops MDT measurement and logging. Furthermore, when the deactivation conditions are met, the UE 105 could remove the information newly added to its stored MDT measurement log(s) as the logged information may no longer be useful.

As such, and as described in greater detail below, MDT measurement configuration in the 3GPP communication system 100 can include deactivation conditions, such as measurement duration and signal strength or quality threshold values. Additionally, the MDT measurement configuration information can include indications whether a UE, such as the UE 105, is to remove recent MDT measurements from its MDT measurement log when the measurement is deactivated.

Furthermore, when a UE, such as the UE 105, encounters coverage holes or failures, (e.g. random access channel (RACH) or broadcast control channel (BCCH) failures), it may be beneficial for the UE 105 to report to the network immediately after the situation improves and the UE 105 is able to do so. Operators can take quick actions if there are many reports in a certain area. Therefore, MDT measurement configurations should include reporting criteria, which can include one or more event identities covering failure cases appropriate for MDT reporting. When one or more of the reporting criteria are satisfied, the UE 105 reports to the network. In an example implementation, if the UE 105 is in idle mode, the UE 105 initiates an RRC connection establishment (e.g., indicating that the purpose is for MDT reporting) so that the network can collect the information recorded in the UE 105. For example, reporting criterion could include an event identity (also referred to as an event descriptor), such as, out of coverage, limited camping, PCH failure, BCCH failure, etc., and other reporting triggering conditions, such as, but not limited to, reporting ranges having upper limits, lower limits, or both (e.g., such as required outage duration ranges), reporting probability factor, etc. Furthermore, one or more MDT filtering techniques can be implemented in the 3GPP communication system 100 to prevent unwanted failure reports or at least reduce their number by configuring a required outage duration range and/or other reporting criteria. For example the operator may not be interested in investigating a short outage or failure (such as occurring when the user may be in elevator for a brief time, such as 20 seconds) or a very long outage (such as occurring when the user may be in a basement watching television for an extended period of time).

As such, and as described in greater detail below, MDT measurement configuration in the 3GPP communication system 100 can include specifying reporting criteria, such as event identities (or descriptors), which may include out of coverage, limited camping, PCH failure, BCCH failure, etc., and other reporting triggering conditions, which may include a reporting range, a reporting probability factor, etc. Also, the UE 105 can indicate MDT reporting as an establishment cause when one or more of the configured reporting criteria are satisfied and the UE 105 initiates RRC connection establishment.

In summary, measurement configuration for MDT can be performed in connected mode and idle mode in the 3GPP communication system 100 depending on one or more validity state indications configured by the network. In the connected mode, the network selects a target UE, such as the UE 105, and configures the measurements by RRC messages, such as measurement control or reconfiguration messages. In idle mode, system information is used to configure MDT measurements. Example MDT configuration information includes, but is not limited to: (1) activation conditions, including thresholds, access classes, positioning capabilities, measurement probability factor, etc.; (2) deactivation conditions, including duration and thresholds; (3) reporting criteria, including event identities (or descriptors) corresponding to out of coverage, limited camping, PCH failure, BCCH failure, etc., and triggering conditions including reporting range, positioning capabilities, access classes and reporting probability factor; (4) an indication whether measurements are to be reported immediately to the network if one or more reporting criteria (if available) are satisfied, or recorded for later collection, etc. After performing the configured MDT measurements, the UE 105 reports MDT measurements immediately or records them for later collection according to the measurement configuration for MDT. In the case of recording, the UE 105 can be configured to remove MDT measurements recently added to its log when the measurement is deactivated according to deactivation conditions or when the reporting criteria are not met.

The 3GPP communication system 100 also employs various techniques to obtain accurate UE positioning information (also referred to as location information) for inclusion or association with MDT measurements reported by, for example, the UE 105. In an example implementation, to reduce UE power impact, positioning measurements (also referred to as positioning procedures, location measurements, location procedures, etc.) are performed by the UE only when the UE encounters a problem, such as entering an area of no coverage, or when the UE recovers from the problem. A difficulty of activating positioning measurements when the UE encounters a problem is that the UE may require network assistance to perform the measurements and network assistance may not available when the UE is experiencing the problem. For example, when the UE 105 is experiencing poor radio conditions, the UE 105 may not be able to receive assistance data or measure the timing difference between target cells (e.g., one of the cells 115-125) and the reference cell (e.g., the cell 110) for observed time difference of arrival (OTDOA) positioning.

To address this difficulty, in an example implementation the positioning measurement is activated when a problem is expected to happen. For example, if downlink pilot signal strength or quality (or another configured metric to be evaluated) becomes worse than a configured threshold value, positioning is activated in the UE 105. In connected mode, the network can obtain received signal power or quality (or another metric value) for the UE 105 using a radio resource management (RRM) measurement and configure periodic positioning measurements if the radio condition becomes worse than the thresholds. For example, in a UTRAN implementation, the serving radio network controller (SRNC) can configure positioning measurements via a measurement control message, whereas in an E-UTRAN implementation, the enhanced Node-B (eNB) can send a positioning measurement request to the enhanced serving mobile location controller (E-SMLC) via the mobility management entity (MME). In the case of idle mode operation, the configuration information for MDT measurements can be provided in system information and indicate, for example, that the UE 105 is to initiate a mobile originated location request (MO-LR) procedure if the radio condition becomes worse than a configured threshold, or that the US 105 is to perform RRC connection establishment indicating that the purpose of the connection establishment is for MDT positioning so that the network can configure positioning measurements.

To allow positioning measurements to be configured and performed successfully, including assistance data delivery, the threshold values to activate positioning should have sufficient margin from the outage level (e.g., to provide sufficient time for positioning to be performed and assistance data to be delivered before an outage is experienced). However if the threshold values provide too much margin, the UE 105 may not experience the outage problems expected by the network because the radio condition may stay the same or improve, thereby resulting in an undesirable waist of UE battery power.

As such, and as described in greater detail below, the duration of positioning measurements for MDT should be limited with, for example, received signal power and/or quality thresholds being used to deactivate positioning measurements. Therefore, in at least some implementations, configuration information for MDT positioning measurements in the 3GPP communication system 100 includes deactivation conditions for positioning measurements, such as duration(s) and threshold(s).

Additionally or alternatively, when the radio condition (e.g., reception) becomes worse than the threshold values, assistance data could be delivered to the UE 105 and actual positioning measurement could be deferred to a later time, such when the UE 105 goes out of coverage or the UE comes back to coverage. In connected mode, the network can obtain received signal power or quality for the UE 105 using an RRM measurement and then transfer the assistance data to the UE 105. In a UTRAN implementation, the SRNC can deliver the assistance data. In an E-UTRAN implementation, the eNB could request an assistance data delivery to the UE 105 from the E-SMLC via MME. Additionally or alternatively, the MDT measurement configuration information could also include assistance data for delivery to the UE. Additionally or alternatively, the MDT measurement configuration information could indicate that the UE should request assistance data delivery by an MO-LR procedure or establish an RRC connection (so that the network can deliver the assistance data in connected mode) if the radio condition becomes worse than the configured threshold(s). In the case of idle mode operation, the measurement configuration for MDT could indicate that the UE 105 should initiate MO-LR procedure to request assistance data if the radio condition becomes worse than the threshold(s). In an example implementation, the assistance data has validity information, such as, for example, a valid area and a duration since its generation. In such an example, the network can indicate the validity information of the assistance data when it is delivered to the UE 105 so that the UE 105 can check if the assistance data is valid before applying it. The advantage of such an approach is shorter latency in positioning measurements. For example, to perform GNSS positioning, the UE 105 can attempt to fix positioning measurements using the assistance data delivered in advance even when the UE 105 is experiencing a problem, such as a coverage hole, to obtain an accurate location of the problem area. To perform enhanced cell identity (E-CID) or OTDOA, the UE 105 can start positioning measurements immediately after the radio condition recovers. However, in order to provide appropriate assistance data, the radio network needs to know the UE positioning capabilities in advance. In UTRAN and E-UTRAN implementations, the UE 105 can provide its positioning capabilities as a part of the MDT capability information signaled in an RRC connection setup complete message.

As such, and as described in greater detail below, in an example implementation, the measurement configuration for MDT should include assistance data and/or an indication that the UE 105 should request assistance data delivery if the radio condition becomes worse than the configured threshold(s). Additionally, the network should deliver assistance data to the UE 105 with associated validity information, such as a duration and an area. Furthermore, the UE 105 should indicate its positioning capabilities as a part of MDT capabilities signaled in an RRC connection setup complete message.

Additionally or alternatively, the network can configure positioning measurements to be performed when the problem the UE 105 is experiencing is resolved, such as when the UE 105 comes back to coverage after being out of coverage or when BCCH reception failures stop being experienced by the UE 105. In contrast, the previous examples attempt to acquire location information when the UE goes out of coverage. However, if the radio conditions degrade rapidly, there may be insufficient time to configure the positioning measurement. Therefore, this alternative attempts to acquire location information when the problem resolves. In the connected mode, the network may configure positioning measurements just after successful completion of the RRC connection reestablishment procedure by use of an RRM measurement configuration. In a UTRAN implementation, the SRNC sends a measurement control message to perform measurement configuration, whereas in an E-UTRAN implementation, the eNB can send a positioning measurement request to the E-SMLC via the MME. In the case of an unsuccessful radio link failure recovery, the network could indicate in an RRC reestablishment reject message to the UE 105 whether the UE 105 should initiate MO-LR procedure so that the UE 105 initiates an MO-LR procedure or an RRC connection establishment indicating that the purpose of the connection establishment is for MDT positioning (so that the network can configure positioning measurements in connected mode) after the RRC connection is established. In idle mode, MDT measurement configurations information broadcast in system information can indicate that the UE should initiate an RRC connection establishment or an MO-LR procedure if the problem the UE 105 is experiencing is resolved or the radio condition becomes worse than one or more thresholds.

Additionally, measurement configuration for MDT can include positioning request criteria and one or more positioning request modes (also referred to as location request modes). For example, the positioning request criteria can include an event identity (or descriptor) and triggering condition. Example event identities include "back to coverage," "the serving cell signal strength or quality becomes worse than threshold," etc., and example triggering conditions include location request probability factor, positioning capabilities, a reporting range (e.g., such as a required outage duration range), an access class, etc. In at least some example implementations, the network includes the probability factor as a triggering condition to reduce the number of location requests. In such examples, upon detection of an event corresponding to a configured event identity, the UE 105 draws a random number. If the random number is lower than the probability factor (or, alternatively, higher than the probability factor) the UE is not allowed to initiate location request procedure. In at least some example implementations, the network also indicates at least one of a required positioning capability, a required access class or a required outage duration range as further ways to limit the number of location requests. For example, if the UE's positioning capabilities do not match the indicated positioning capabilities or the UE's access class does not match the indicated access class, the UE 105 is not allowed to initiate a location procedure for MDT. Also, if the detected event is out of coverage and the duration of out of coverage is not within the configured outage duration range, the UE 105 is not allowed to initiate a location request for MDT. By using a required outage duration range, location requests associated with short lived (e.g., shorter than the required duration range) or prolonged (e.g., longer than the required duration range) coverage problems (e.g., such as being in an elevator or watching television in a basement) can be prevented to reduce network loading.

Example positioning request modes include, but are not limited to, MO-LR (assistance data request), MO-LR (positioning measurement), RRC connection establishment, etc. If RRC connection is requested, the UE 105 indicates an MDT positioning request in the RRC connection establishment procedure, for example as the establishment cause in the RRC connection request message, or as an additional information element in the RRC connection setup complete message. In response, the network can invoke an RRM positioning measurement and/or collect logged information from the UE 105.

As such, and as described in greater detail below, in an example implementation, the 3GPP communication network 100 configures the UE 105 to initiate an RRC connection or a location request upon returning to a coverage area. Additionally, measurement configuration for MDT can include location request criteria and positioning request modes. Location request criteria can include event identities (or descriptors) and triggering conditions. Triggering conditions include, for example, a location request probability factor, required positioning capabilities, a required outage duration range, upper limits and/or lower limits, etc. to reduce the number of location requests. Positioning request modes include, for example, MO-LR for assistance data, MO-LR for positioning measurement, RRC connection request, etc. Furthermore, in at least some example implementations, if the measurement configuration for MDT requests the UE 105 to establish an RRC connection for positioning, the UE indicates MDT positioning as an establishment cause in the RRC connection request message or as an additional information element in the RRC connection setup complete message.

In some scenarios, positioning just after returning to the coverage area may not produce accurate location information because the number of visible satellites may be small or the number of neighbour cells for timing difference measurements may be limited. Therefore, in an example implementation, multiple positioning procedures, if available, are performed. For example, while performing global positioning system (GPS) positioning, the UE 105 could also choose a number of suitable neighbouring cells and measure pilot signal strength and quality for possible E-CID calculation. For example, if the list of the cells for E-CID positioning is available to the UE 105, the UE 105 measures those cells. Meanwhile, on the network side, the serving base station implementing the current cell 110 could measure angle of arrival (AOA) and received signal power if the UE 105 is in connected mode.

Because it may take some time to complete positioning measurements, in an example implementation, positioning is configured to be a periodic measurement and, in addition, a velocity measurement is included, if available. In such an example, the UE 105 or network can use the periodic positioning and velocity measurements to extrapolate the position where the UE 105 returned to coverage using, for example, multiple instances of these measurements and a time since the first location fix.

In summary, the 3GPP communication system 100 supports configuration of some or all of the following to determine positioning (location) information for MDT measurement: (1) deactivation conditions for positioning measurements, such as duration and thresholds; (2) assistance data with its validity information, such as duration and area; (3) location request criteria indicating the UE 105 should initiate location request procedures if the criteria are met, with example location request criteria including one or more event identities, location request probability factors, positioning capabilities, required reporting ranges (e.g., such as required outage duration ranges), access class, etc.; and (4) positioning request mode that specifies what location request procedure(e), such as MO-LR (assistance data request), MO-LR (positioning measurement) and RRC connection establishment, etc., the UE 105 is to invoke when the location request criteria are met.

Although the example methods and apparatus disclosed herein are described in the context of the example 3GPP communication system 100 of FIG. 1, these example methods and apparatus can be readily adapted for use in any communication system employing an MDT framework in which MDT measurement can be performed.

Figure 2:
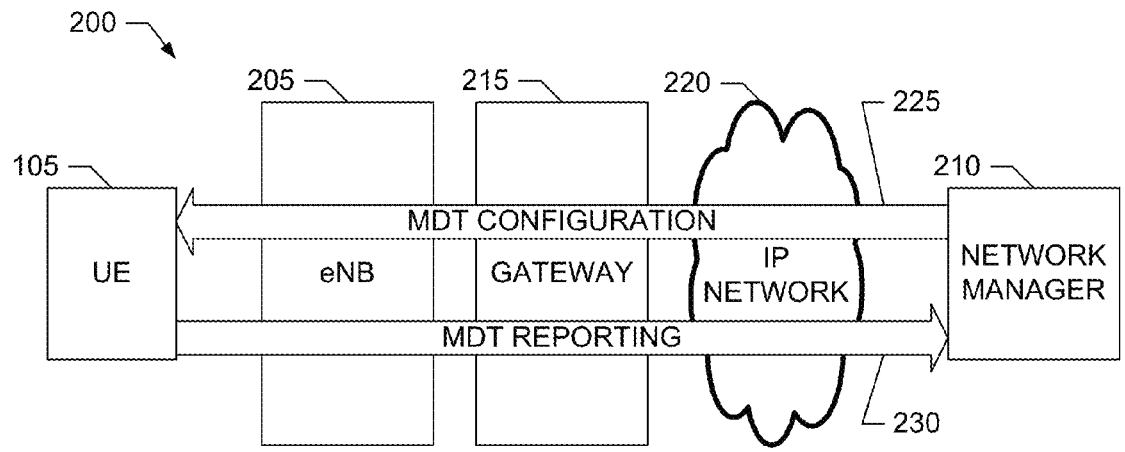
FIG. 2 is a block diagram of an example MDT user plane architecture for implementing MDT measurements in the 3GPP communication system of FIG. 1.

An example User-Plane (U-Plane) architecture 200 for implementing an MDT framework in the 3GPP communication system 100 of FIG. 1 is illustrated in FIG. 2. The U-Plane architecture 200 of FIG. 2 also illustrates involvement of the operator's core network to implement the MDT framework. The U-Plane architecture 200 corresponds to an E-UTRAN implementation and includes the UE 105 and an eNB 205 implementing the current cell 110. Portions of the operator's core network involved in the MDT framework include a network manager 210 and a gateway 215 implementing, for example, a packet data network (PDN) gateway and a serving gateway to communicatively couple the eNB 210 to the operator's Internet protocol (IP) network 220.

In the U-Plane architecture 200, the eNB 205 and the UE 105 establish a normal user plane connection, represented as directed arrows 225 and 230. The downlink user plane connection 225 is used by the network manager 210 to configure MDT functionality in the UE 105. Such configuration can be performed via, for example, dynamic over-the-air configuration using one or more short message service (SMS) messages, one or more emails, one or more BlackBerry® personal identification number (PIN) messages, etc. The uplink user plane connection 230 is used by the UE 105 to transport MDT measurement logs to the network manager 210, which are transparent to the eNB 205 and the rest of the core network. In an example implementation, measurements could be logged by the UE 105 for a period of time (e.g. such as several minutes, one or more hours, a day, etc.). In such an example, the size of the log files transported by the UE 105 to the network manager 210 could be on the order of several megabytes per day.

Figure 3:
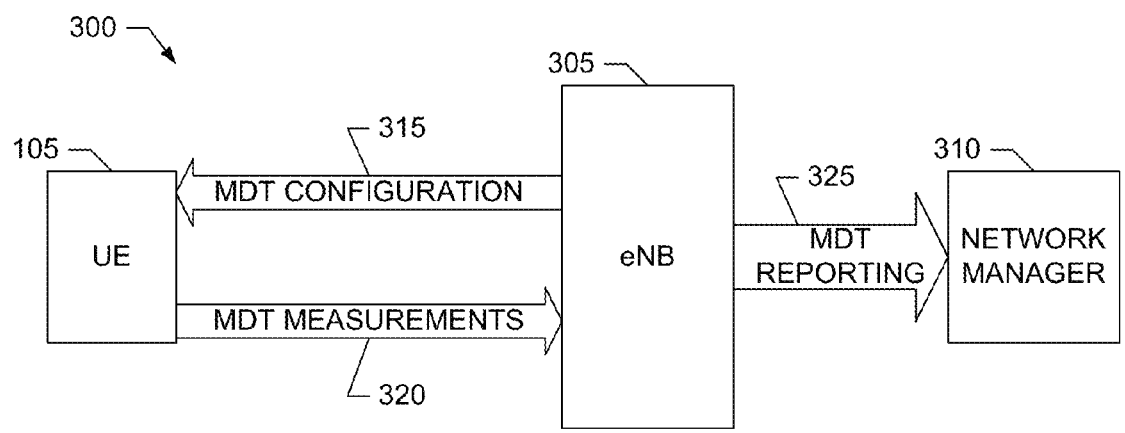
FIG. 3 is a block diagram of an example MDT control plane architecture for implementing MDT measurements in the 3GPP communication system of FIG. 1.

An example Control-Plane (C-Plane) architecture 300 for implementing an MDT framework in the 3GPP communication system 100 of FIG. 1 is illustrated in FIG. 3. Relative to the U-Plane architecture 200 of FIG. 2, involvement of the core network to implement MDT using the C-Plane architecture 300 is reduced. The C-Plane architecture 300 corresponds to an E-UTRAN implementation and includes the UE 105, an eNB 305 implementing the current cell 110, and a network manager 310. In the C-Plane architecture 300, the eNB 305 configures the UE 105 for MDT operation using, for example, one or more RRC signaling messages, which are represented by a downlink directed arrow 315. The eNB 305 collects MDT measurements from the UE 105 via, for example, measurement reporting, RRC signaling, etc., represented by an uplink directed arrow 320. The eNB 305 then combines the collected measurement with other available results and forwards the combined measurements (e.g., possibly after filtering) to the network manager 310, with such forwarding being represented by a directed arrow 325. After collecting and processing the measurements from one or more UEs (e.g., including the UE 105), the obtained and processed logs are transferred from the network manager 310 to an operations and maintenance (O&M) system (not shown).

Figure 4:
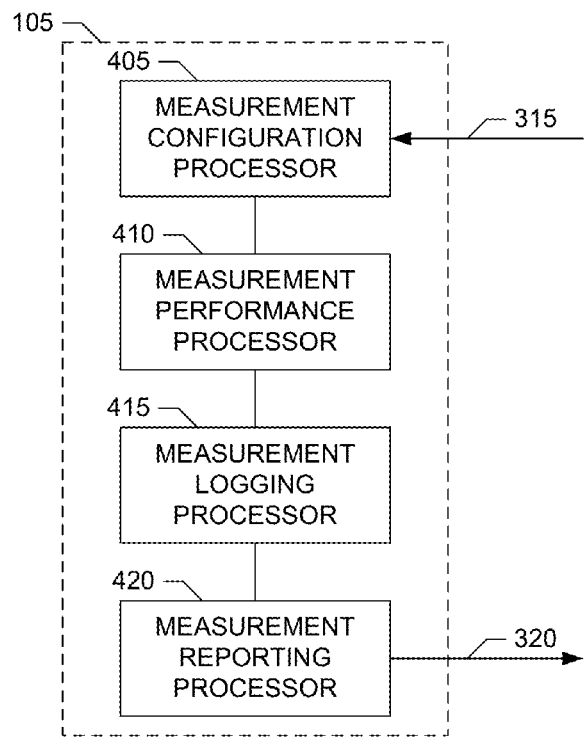
FIG. 4 is a block diagram of an example UE supporting the MDT control plane architecture of FIG. 3.
Figure 5:
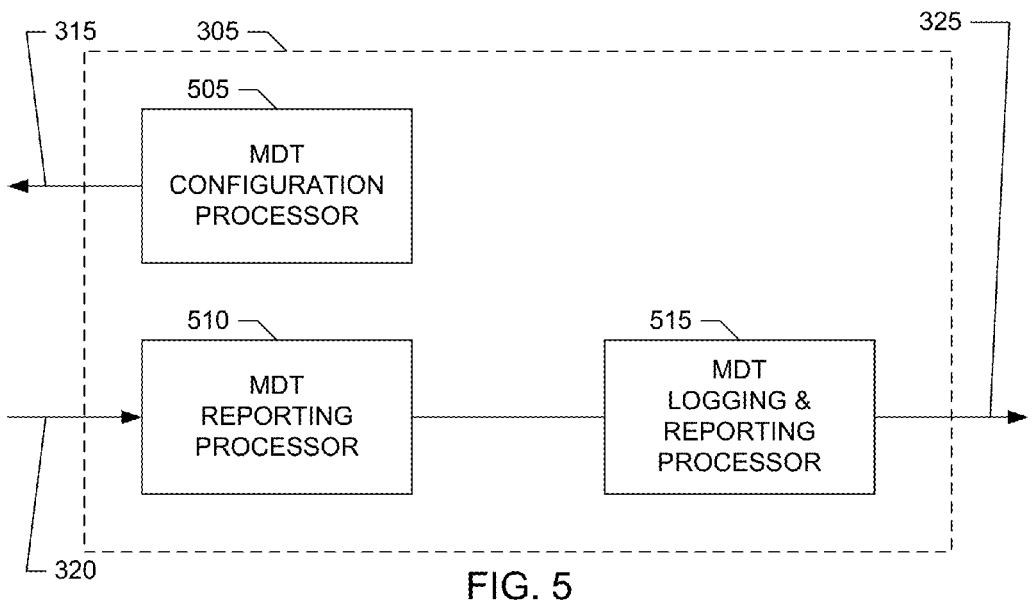
FIG. 5 is a block diagram of an example network element supporting the MDT control plane architecture of FIG. 3.

Example implementations of the UE 105 and the eNB 305 to support the C-Plane architecture 300 of FIG. 3 are illustrated in FIGS. 4 and 5, respectively. For clarity, interfaces that are common among FIGS. 3-5 are labeled with the same reference numerals. Turning to FIG. 4, the illustrated implementation of the UE 105 includes an example measurement configuration processor 405 to receive MDT measurement configuration information, including one or more activation, deactivation, reporting and/or other conditions described in greater detail below, from the eNB 305. The UE 105 of FIG. 4 also includes an example measurement performance processor 410 to perform one or more MDT measurements based on the configuration information received by the measurement configuration processor 405. The UE 105 of FIG. 4 further includes a measurement logging processor 415 to log (e.g., store in a particular format) and filter (if appropriate) the MDT measurement(s) determined by the measurement performance processor 410. To report the MDT measurements logged by the measurement logging processor 415 and/or other more immediate MDT measurements to the eNB 305, the UE 105 of FIG. 4 includes a measurement reporting processor 420. Example implementations and operation of the measurement configuration processor 405, the measurement performance processor 410, the measurement logging processor 415 and the measurement reporting processor 420 are illustrated in subsequent figures and described in greater detail below. Furthermore, although described in the context of supporting the C-Plane architecture 300 of FIG. 3, the measurement configuration processor 405, the measurement performance processor 410, the measurement logging processor 415 and the measurement reporting processor 420 could be readily adapted to support MDT measurement configuration and reporting via U-Plane messaging to additionally or alternatively support the U-Plane architecture 200 of FIG. 2.

In FIG. 5, the illustrated implementation of the eNB 305 includes an MDT configuration processor 505 to prepare and send MDT configuration information, including one or more activation, deactivation, reporting and/or other conditions described in greater detail below, to the UE 105. The eNB 305 also includes an MDT reporting processor 510 to receive MDT measurement reports/logs from the UE 105 via, for example, measurement reporting, RRC signaling, etc. The eNB 305 further includes an MDT logging and reporting processor 515 to forward the MDT measurements/logs received from one or more UEs (e.g., including the UE 105) to the network manager 310 for further processing. Example implementations and operation of the MDT configuration processor 505, the MDT reporting processor 510 and the MDT logging and reporting processor 515 are illustrated in subsequent figures and described in greater detail below.

While an example manner of implementing the UE 105 of FIGS. 1-3 has been illustrated in FIG. 4, and an example manner of implementing the eNB 305 of FIG. 3 has been illustrated in FIG. 5, one or more of the elements, processes and/or devices illustrated in FIGS. 4-5 may be combined, divided, re-arranged, omitted, eliminated and/or implemented in any other way. Further, the example measurement configuration processor 405, the example measurement performance processor 410, the example measurement logging processor 415, the example measurement reporting processor 420 and/or, more generally, the example UE 105 of FIG. 4 may be implemented by hardware, software, firmware and/or any combination of hardware, software and/or firmware. Similarly, the example MDT configuration processor 505, the example MDT reporting processor 510, the example MDT logging and reporting processor 515 and/or, more generally, the example eNB 305 of FIG. 5 may be implemented by hardware, software, firmware and/or any combination of hardware, software and/or firmware. Thus, for example, any of the example UE 105, the example measurement configuration processor 405, the example measurement performance processor 410, the example measurement logging processor 415, the example measurement reporting processor 420, the example eNB 305, the example MDT configuration processor 505, the example MDT reporting processor 510 and/or the example MDT logging and reporting processor 515 could be implemented by one or more circuit(s), programmable processor(s), application specific integrated circuit(s) (ASIC(s)), programmable logic device(s) (PLD(s)) and/or field programmable logic device(s) (FPLD(s)), etc. In at least some example implementations, at least one of the example UE 105, the example measurement configuration processor 405, the example measurement performance processor 410, the example measurement logging processor 415, the example measurement reporting processor 420, the example eNB 305, the example MDT configuration processor 505, the example MDT reporting processor 510 and/or the example MDT logging and reporting processor 515 are hereby expressly defined to include a tangible medium such as a memory, digital versatile disk (DVD), compact disk (CD), etc., storing such software and/or firmware. Further still, the example UE 105 of FIG. 4 and/or the example eNB 305 of FIG. 5 may include one or more elements, processes and/or devices in addition to, or instead of, those illustrated in FIGS. 4-5, respectively, and/or may include more than one of any or all of the illustrated elements, processes and devices.

Flowcharts representative of example processes that may be executed to implement the example 3GPP communication system 100, the example U-Plane architecture 200, the example C-Plane architecture 300, the UE 105, the example measurement configuration processor 405, the example measurement performance processor 410, the example measurement logging processor 415, the example measurement reporting processor 420, the example eNB 305, the example MDT configuration processor 505, the example MDT reporting processor 510 and/or the example MDT logging and reporting processor 515 are shown in FIGS. 6, 7, 8A-B, 10-15, and 17-21. In these examples, the process represented by each flowchart may be implemented by one or more programs comprising machine readable instructions for execution by: (a) a processor, such as the processor 2212 shown in the example processing system 2200 discussed below in connection with FIG. 22, (b) a controller, and/or (c) any other suitable device. The one or more programs may be embodied in software stored on a tangible medium such as, for example, a flash memory, a CD-ROM, a floppy disk, a hard drive, a DVD, or a memory associated with the processor 2212, but the entire program or programs and/or portions thereof could alternatively be executed by a device other than the processor 2212 and/or embodied in firmware or dedicated hardware (e.g., implemented by an ASIC, a PLD, an FPLD, discrete logic, etc.).

For example, any or all of the example 3GPP communication system 100, the example U-Plane architecture 200, the example C-Plane architecture 300, the UE 105, the example measurement configuration processor 405, the example measurement performance processor 410, the example measurement logging processor 415, the example measurement reporting processor 420, the example eNB 305, the example MDT configuration processor 505, the example MDT reporting processor 510 and/or the example MDT logging and reporting processor 515 could be implemented by any combination of software, hardware, and/or firmware. Also, at least some of the processes represented by the flowcharts of FIGS. 6, 7, 8A-B, 10-15, and 17-21 may be implemented manually. Further, although the example processes are described with reference to the flowcharts illustrated in FIGS. 6, 7, 8A-B, 10-15, and 17-21, many other techniques for implementing the example methods and apparatus described herein may alternatively be used. For example, with reference to the flowcharts illustrated in FIGS. 6, 7, 8A-B, 10-15, and 17-21, the order of execution of the blocks may be changed, and/or some of the blocks described may be changed, eliminated, combined and/or subdivided into multiple blocks.

In some or all of the example processes 600, 800, 1000 and 1100 described below, when valid MDT measurement logging information is available (e.g., when the UE 105 is about to and/or has experienced a coverage or ping pong problem), the UE 105 may request an RRC connection with a specific establishment cause for "MDT reporting" in the RRC connection request message to report the logged MDT measurement data if any configured reporting criteria (if present) are met. Alternatively, the UE 105 may include an information element which indicates "MDT reporting" in an RRC connection setup complete message.

Figures 6, 7:
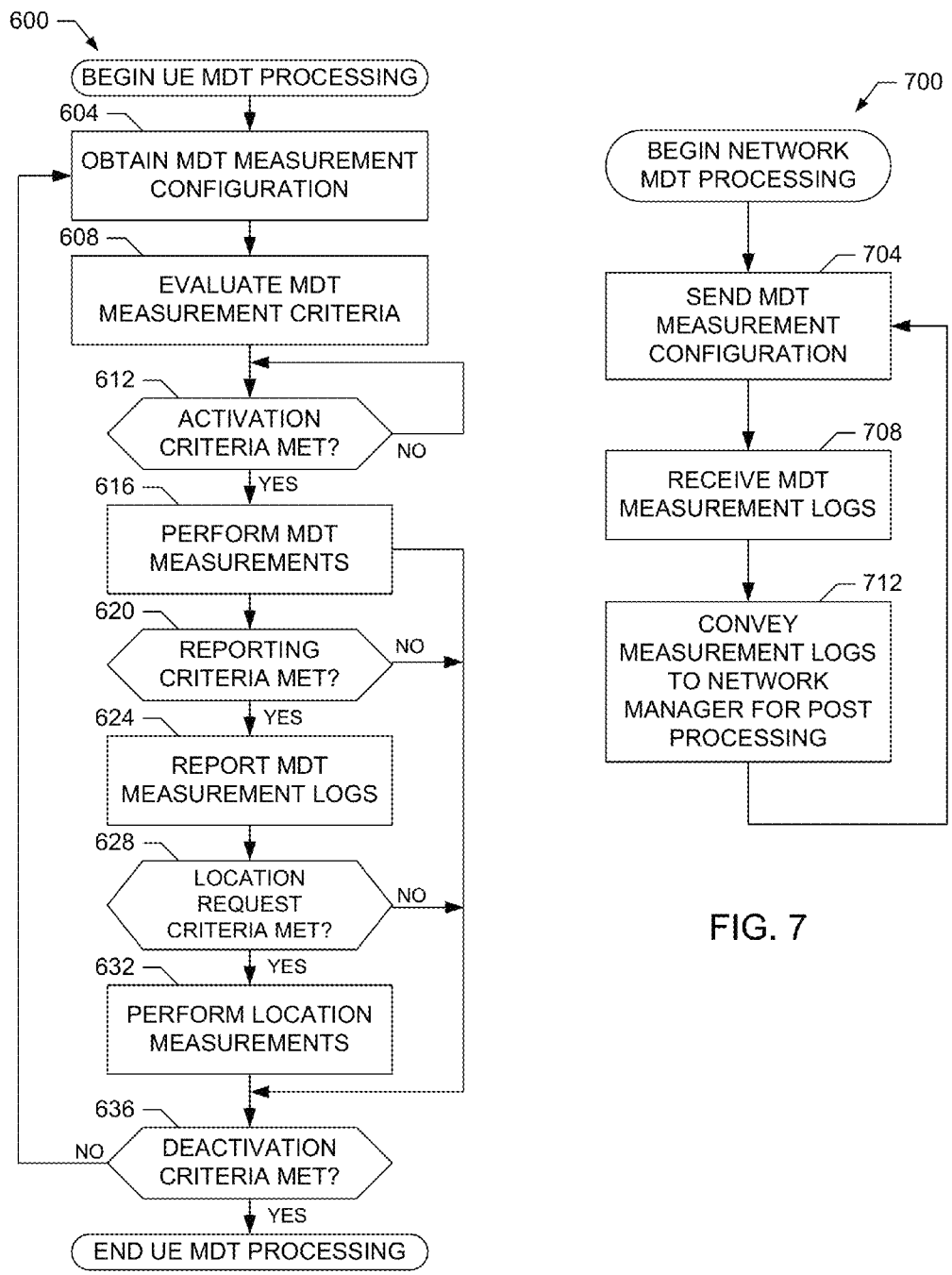
FIG. 6 is a flowchart representative of an example process that may be performed to implement MDT processing in the UE of FIG. 4.
FIG. 7 is a flowchart representative of an example process that may be performed to implement MDT processing in the network element of FIG. 5.

An example generic process 600 that may be executed to implement MDT processing in the UE 105 of FIGS. 1-4 is illustrated in FIG. 6. The process 600 may be executed as a background process, periodically, based on an occurrence of a predetermined event, etc., or any combination thereof. With reference to FIGS. 1-4, the process 600 begins at block 604 at which the measurement configuration processor 405 included in the UE 105 obtains MDT measurement configuration information via, for example, RRC signaling, broadcast system information, etc. Examples of MDT configuration information obtained at block 604 are described above in connection with FIG. 1 and also in greater detail below. Example MDT configuration information is also listed in Table 1 described below.

Next, at block 608 the measurement performance processor 410 included in the UE 105 evaluates one or more MDT measurement activation criteria specified in the MDT configuration information obtained at block 604. In an example implementation, if one or more of the activation criteria are met (block 612) or, in another example implementation, if all activation criteria are met (block 612), then at block 616 the measurement performance processor 410 performs the configured MDT measurement(s) and the measurement logging processor 415 included in the UE 105 logs the measurement results (or the measurement reporting processor 420 included in the UE 105 reports the measurement results, for example, if immediate reporting is configured). At block 620, the measurement reporting processor 420 included in the UE 105 evaluates one or more MDT reporting criteria specified in the MDT configuration information obtained at block 604. In an example implementation, if one or more of the reporting criteria are met (block 620) or, in another example implementation, if all reporting criteria are met (block 620), then at block 624 the measurement reporting processor 420 reports the MDT measurement logs to, for example, the eNB 305 implementing the current cell 110.

At block 628, the measurement performance processor 410 evaluates one or more MDT location request criteria specified in the MDT configuration information obtained at block 604. In an example implementation, if one or more of the location request criteria are met (block 628) or, in another example implementation, if all location request criteria are met (block 628), then at block 632 the measurement performance processor 410 performs positioning measurements and/or requests location information from the network as specified by the MDT configuration information obtained at block 604. At block 636, the measurement performance processor 410 evaluates one or more MDT measurement deactivation criteria specified in the MDT configuration information obtained at block 604. In an example implementation, if none of the deactivation criteria are met (block 636) or, in another example implementation, if all of the deactivation criteria are not met (block 636), MDT measurement processing continues and, in the illustrated example, the process 600 returns to block 604 to allow the UE 105 to obtain new/updated MDT configuration information (if present). Otherwise, MDT measurements are deactivated, as well as logging and reporting in at least some example implementations, and the process 600 ends until its next invocation.

In at least some example implementations, separate deactivation criteria for performing MDT measurements and for performing MDT location requests may be examined at block 636. As such, MDT measurements, MDT location requests, or both, may be deactivated independently or collectively via the processing at block 636.

Examples of processes that may be used to implement some or all of the processing in the generic process 600 are illustrated in the following figures and described in greater detail below.

An example generic process 700 that may be executed to implement MDT processing in the eNB 305 of FIGS. 2-3 and 5 is illustrated in FIG. 7. The process 700 may be executed as a background process, periodically, based on an occurrence of a predetermined event, etc., or any combination thereof. With reference to FIGS. 2-3 and 5, the process 700 begins at block 704 at which the MDT configuration processor 505 included in the eNB 505 prepares and sends MDT configuration information to UEs (e.g., such as the UE 105) via RRC signaling, broadcast system information, etc. Examples of MDT configuration information obtained at block 604 are described above in connection with FIG. 1 and also in greater detail below. Example MDT configuration information is also listed in Table 1 described below.

At block 708, the MDT reporting processor 510 included in the eNB 305 receives MDT measurement logs via measurement reports, RRC signaling, etc., from one or more UEs (e.g., such as the UE 105) being served by the eNB 305. Then, at block 712 the MDT logging and reporting processor 515 included in the eNB 305 forwards the MDT measurements/logs received from the one or more UEs (e.g., including the UE 105) to, for example, the network manager 310 for further processing. In the illustrated example, at some later time, the eNB 305 prepares new/updated MDT configuration information to be sent and, thus, the process 700 returns to block 704.

Examples of processes that may be used to implement some or all of the processing in the generic process 700 are illustrated in the following figures and described in greater detail below.

Figure 8A:
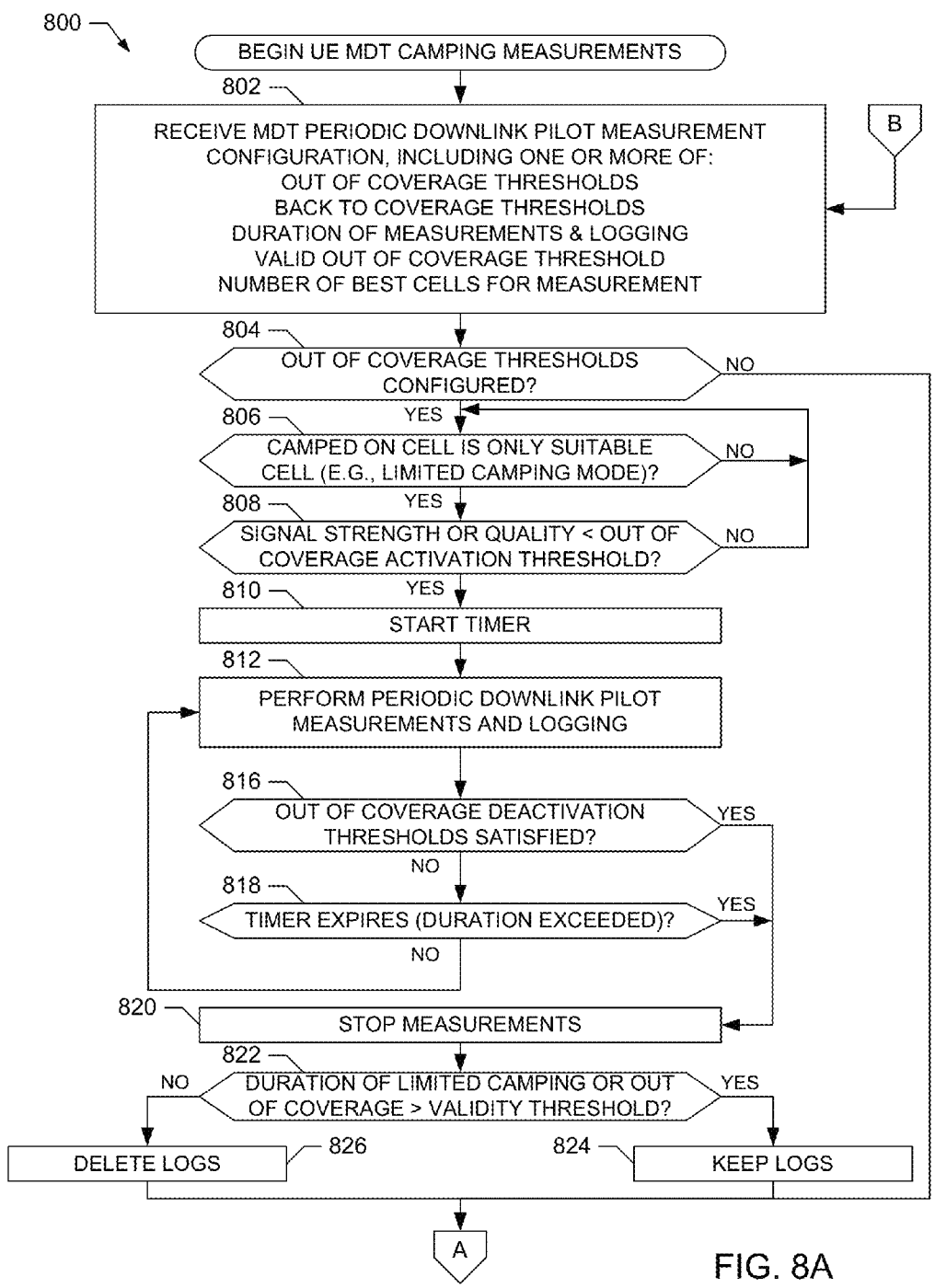
FIGS. 8A-B collectively are a flowchart representative of an example process that may be performed to implement MDT camping measurements in the UE of FIG. 4.
Figure 8B:
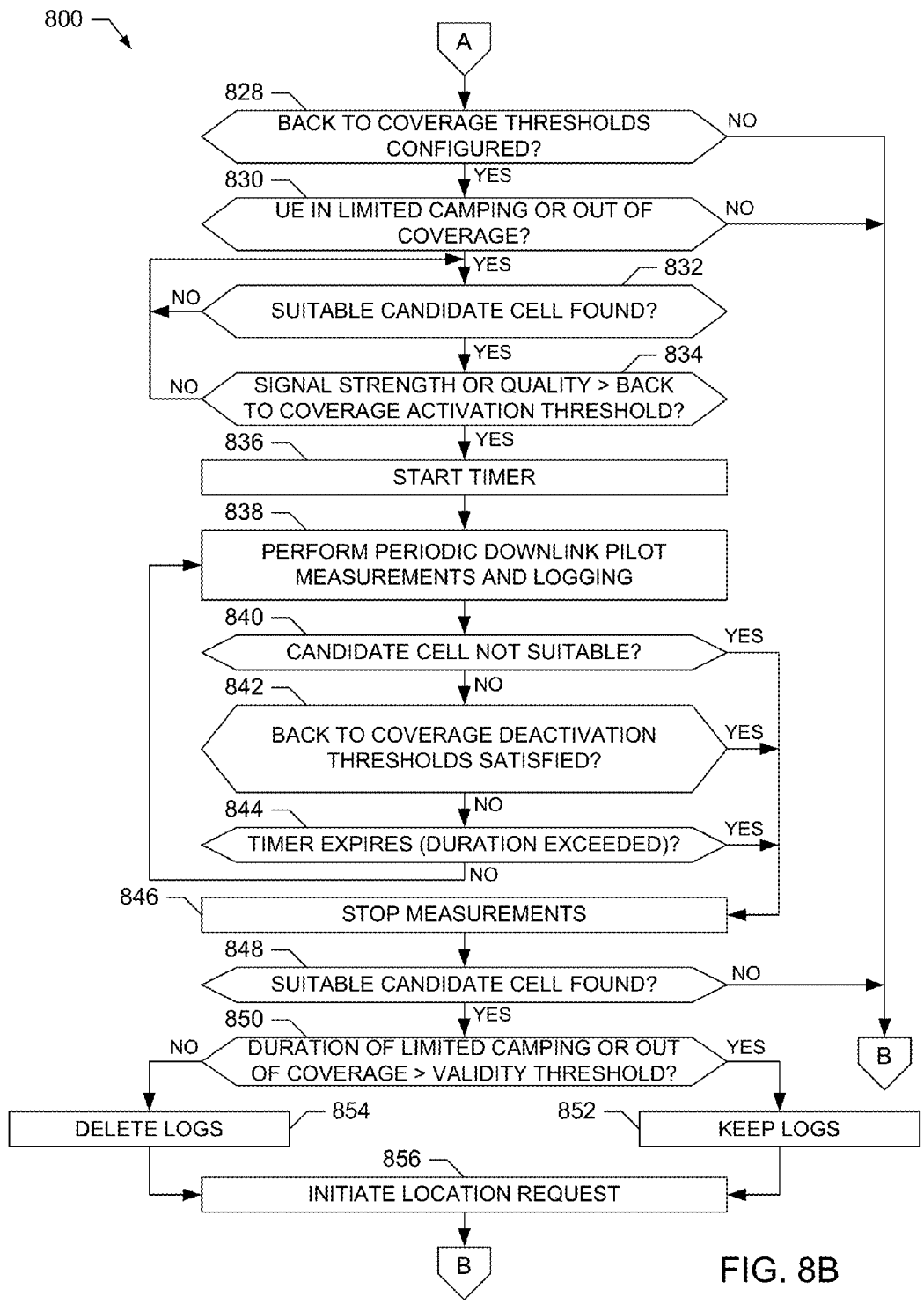

An example process 800 that may be performed by the UE 105 to determine MDT cell selection/reselection measurements (e.g., also referred to as camping measurement) is illustrated in FIGS. 8A-B. The process 800 may be used to implement at least portions of the generic process 600 of FIG. 6. If MDT cell selection/reselection measurement and logging is enabled by the network, the UE 105 is configured according to the process 800 to perform PDP measurements, when in idle mode, periodically or when cell selection/reselection is performed. Additionally, the UE 105 is configured to measure and log/report any, some or all of the following information to the network: (1) a camped state (e.g., limited or normal); (2) a mobility state (e.g., normal/medium/high); (3) a priority or priorities of the camped on or serving cell and a particular (e.g., specified) number of best neighboring cells; (3) any barred and reserved status of a particular (e.g., specified) number of strongest cells; (5) a particular (e.g., specified) number of strongest not-allowed closed subscription group (CSG) cells, etc. Furthermore, the network configures the duration and certain conditions under which cell selection/reselection measurement and logging is to be performed by the UE 105 to, for example, reduce the probability that the amount of logging information overflows the UE's memory capacity.

Turning to FIG. 8A, the process 800 begins at block 802 at which the UE 105 obtains MDT measurement configuration information including one or more of the following: out of coverage activation and deactivation thresholds, back to coverage activation and deactivation thresholds, a specified duration of measurement and logging (e.g., to be used as a deactivation condition), a specified valid out of coverage duration (e.g., to be used as a logging/reporting criterion), a specified number of best cells for measurement, etc. For example, an out of coverage activation threshold is used to activate MDT measurements when a signal strength or quality falls below the activation threshold, whereas an out of coverage deactivation threshold is used to deactivate the activated MDT measurements. For example, when the signal strength or quality falls below a first out of coverage deactivation threshold (e.g., which may be the same as, or similar to, the cell selection S criteria defined in 3GPP TS 25.304 for UTRAN and 3GPP TS 36.304 for E-UTRAN) or exceeds a second out of coverage deactivation threshold, the MDT measurements are deactivated.

Figure 23:
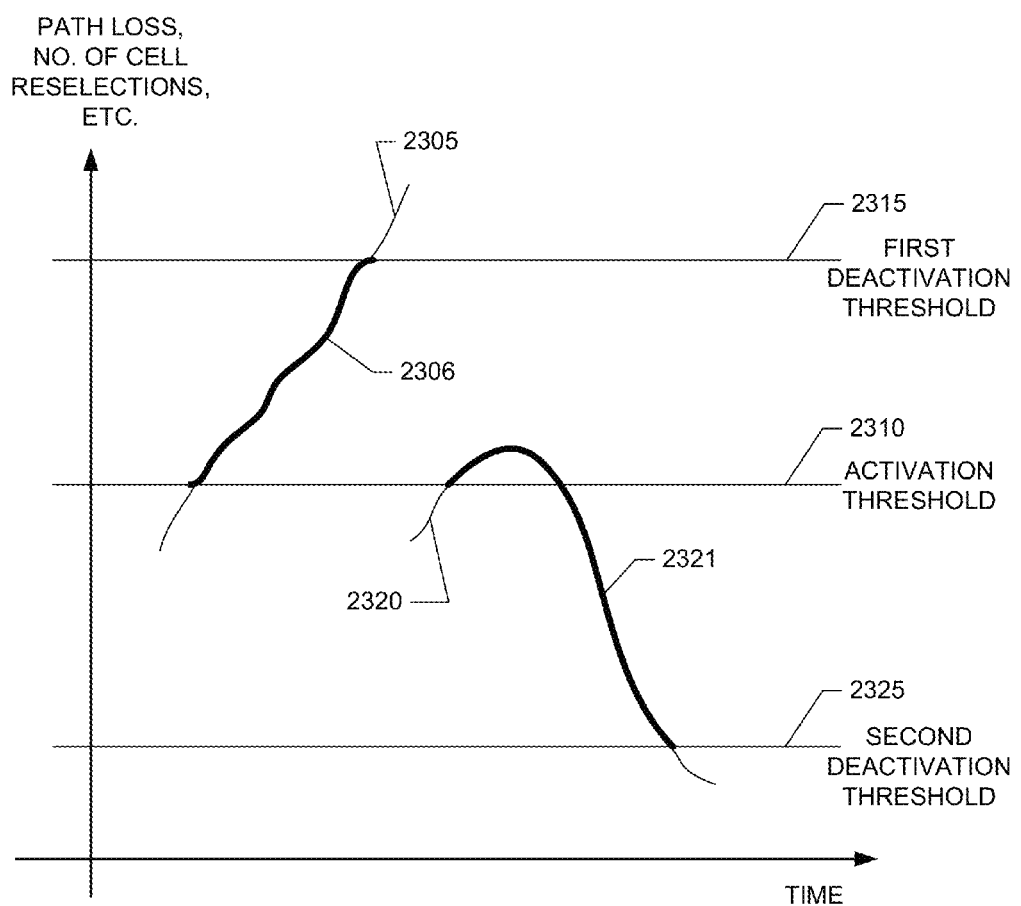
FIG. 23 illustrates examples of utilizing activation and deactivation thresholds to activate and deactivate MDT measurements in the UE of FIG. 4.

Such use of these two example deactivation thresholds is illustrated in FIG. 23, in which path loss (which is related inversely to signal strength or quality) is represented on the Y-axis, and time is represented on the X-axis. In the example of FIG. 23, a first line 2305 illustrates a first example scenario in which MDT measurements are activated (represented by a bold portion 2306 of the first line 2305) when the path loss exceeds an activation threshold 2310 (corresponding to when the signal strength/quality falls below the activation threshold 2310) and then are deactivated when the path loss exceeds a first deactivation threshold 2315 (corresponding to when the signal strength/quality falls below the first deactivation threshold 2315). A second line 2320 illustrates a second example scenario in which MDT measurements are activated (represented by a bold portion 2321 of the first line 2320) when path loss exceeds the activation threshold 2310 (corresponding to when the signal strength/quality falls below the activation threshold 2310) and then are deactivated when the path loss falls below a second deactivation threshold 2325

(corresponding to when the signal strength/quality exceeds the second deactivation threshold 2315). With reference to FIG. 23, in situations similar to the first scenario in which the first out of coverage deactivation threshold is satisfied, the UE 105 continues to be out of coverage. As such, MDT measurements which were performed and logged are likely useful for identifying a coverage hole problem. However, in situations similar to the second scenario in which the second out of coverage deactivation threshold is satisfied, the radio condition improves for the UE 105 and, thus, the MDT measurements which were performed and logged are likely to be less useful for identifying a coverage hole problem.

Conversely, a back to coverage activation threshold is used to activate MDT measurements when a signal strength or quality exceeds the activation threshold, whereas a back to coverage deactivation threshold is used to deactivate the activated MDT measurements. For example, when the signal strength or quality exceeds a first back to coverage deactivation threshold (which may be the same as, or similar to, the cell selection S criteria defined in 3GPP TS 25.304 for UTRAN and 3GPP TS 36.304 for E-UTRAN) or falls below a second deactivation back to coverage threshold the MDT measurements are deactivated. In a situation in which the first back to coverage deactivation threshold is satisfied, the UE 105 continues to remain back in coverage. As such, MDT measurements which were performed and logged are likely useful for identifying a coverage hole problem. However, in a situation in which the second back to coverage deactivation threshold is satisfied, the radio condition degrades again for the UE 105 and, thus, the MDT measurements which were performed and logged are likely to be less useful for identifying a coverage hole problem. In at least some example implementations, to help ensure stable activation and deactivation decisions, the UE 105 employs a hysteresis timer between MDT measurement activations and deactivations to ensure a predefined or configured (e.g., by the network) duration of time has expired before switching between MDT measurement activation and deactivation, and vice versa.

Returning to FIG. 8A, if an out of coverage activation threshold is configured (block 804), the UE 105 is to perform PDP measurements when the UE 105 is losing coverage, such as when the UE 105 transitions from normal camping to an under coverage condition (e.g., limited camping), or from an under coverage condition to an out of coverage condition. As such, if an out of coverage threshold is configured (block 804), the UE 105 determines whether the camped on cell is the only suitable cell (block 806). If the camped on cell is the only suitable cell (block 806) and if the camped on cell's signal strength, signal quality, or both, become worse than the corresponding configured threshold value(s) (block 808), the UE 105 starts a timer (block 810), and initiates PDP measurements and logging (block 812). The timer is employed at block 810 to allow the UE 105 to perform MDT measurements when initially entering an out of coverage condition or the radio condition begins to improve, but to prevent the UE 105 from continuing to perform such MDT measurements (and potentially wasting battery life and resources unnecessarily in the process) if the UE 105 remains out of coverage or experiences improved radio conditions for an extended period of time. At some time later, if at least one of the signal strength or the signal quality of the camped on cell becomes worse than the first out of coverage threshold value described above, or better than the second out of coverage threshold value described above (block 816) or the timer expires (block 818), the UE 105 stops the timer, measurements and logging (block 820).

If the UE 105 goes into limited camping mode and the duration of being in the limited camping mode is longer than a configured valid duration threshold (block 822), the UE 105 retains the logged MDT measurements (block 824) for subsequent reporting when the UE 105 returns to coverage. Similarly, if the UE 105 goes out of coverage and the duration of being out of coverage is longer than a valid out of coverage duration threshold (block 822), the UE 105 retains the logged MDT measurements (block 824). Otherwise, the UE 105 deletes the recently logged MDT measurements corresponding to those MDT measurements that were initiated at block 812 (block 826). Such MDT measurement deletion may be configured by the MDT configuration information provided by the network.

In at least some example implementations, the UE 105 can be configured to periodically restart MDT measurements after being stopped at block 820 if, for example, the UE 105 remains out of coverage for an extended period of time. For example, a second timer can be configured to implement a wait period. When the second timer expires, the UE 105 can check whether it is still out of coverage (e.g., using the out of coverage activation threshold as in block 808) and, if so, restart and perform MDT measurements for a configured period of time tracked by the first timer used at block 810. After performing the MDT measurements for the configured period of time, the UE 105 can stop such MDT measurements until the wait period tracked by the second timer expires again.

Additionally or alternatively, if a back to coverage threshold is configured (block 828 of FIG. 8B), the UE 105 is to perform PDP measurements when the UE 105 returns to coverage after being in a limited camping or out of coverage state (e.g., such as returning to normal camping from limited camping, or returning to an under coverage state from being out of coverage) (block 830). As such, if the UE 105 is in a limited camping or out of coverage state (block 830), and the UE 105 finds a candidate for a suitable cell (block 832) and the suitable cell's signal strength, signal quality, or both, become better than the corresponding configured back to coverage activation threshold(s) (block 834), the UE 105 starts a timer (block 836), and initiates PDP measurements and logging (block 836). At some time later, if the cell found at block 832 turns out not to be suitable (block 840), or if the signal strength and/or signal quality of the candidate cell becomes better than the first back to coverage threshold value described above or the signal strength and/or signal quality of all candidate cells become worse than the second back to coverage threshold value described above (block 842), or if the timer expires (block 844), the UE 105 stops the timer, measurements and logging (block 846).

If the UE 105 was in limited camping mode, finds a suitable cell (block 848) and the duration of being in the limited camping mode is longer than a configured valid duration threshold (block 850), the UE 105 retains the logged MDT measurements (block 852). Similarly, if the UE 105 finds a suitable cell (block 848) and the duration of being out of coverage is longer than a valid out of coverage duration threshold (block 850), the UE 105 retains the logged MDT measurements (block 852). Otherwise, the UE 105 deletes the recently logged MDT measurements corresponding to those MDT measurements that were initiated at block 838 (block 854). Such MDT measurement deletion may be configured by the MDT configuration information provided by the network. Additionally, if the UE 105 finds a suitable cell to camp on (block 848), the UE initiates a location request procedure (block 856), such as an MO-LR, to obtain location information (e.g., if location information whose resolution is finer than a cell identity is not available) if one or more location request criteria or, alternatively, all location request criteria (if present in the configuration information obtained at block 804) are satisfied. The type of positioning procedure initiated at block 856 may depend on the MDT measurement configuration provided by the network.

The process 800 illustrated in FIGS. 8A-B corresponds to an example implementation in which the UE 105 and the network support configuration of both out of coverage activation and deactivation thresholds, and back to coverage activation and deactivation thresholds. However, in example implementations in which configuration of only out of coverage activation and deactivation thresholds or only back to coverage activation and deactivation thresholds is supported, but not both at the same time, the process 800 can be divided into two separate processes, with the processing in FIG. 8A utilizing out of coverage activation and deactivation thresholds being performed independently of the processing in FIG. 8B utilizing back to coverage activation and deactivation thresholds. In other words, in an example implementation, each threshold comparison operation (as well as time comparison operation) described above is performed if the corresponding threshold (or timer) value is preconfigured or configured by the network via the MDT configuration information.

Figure 9:
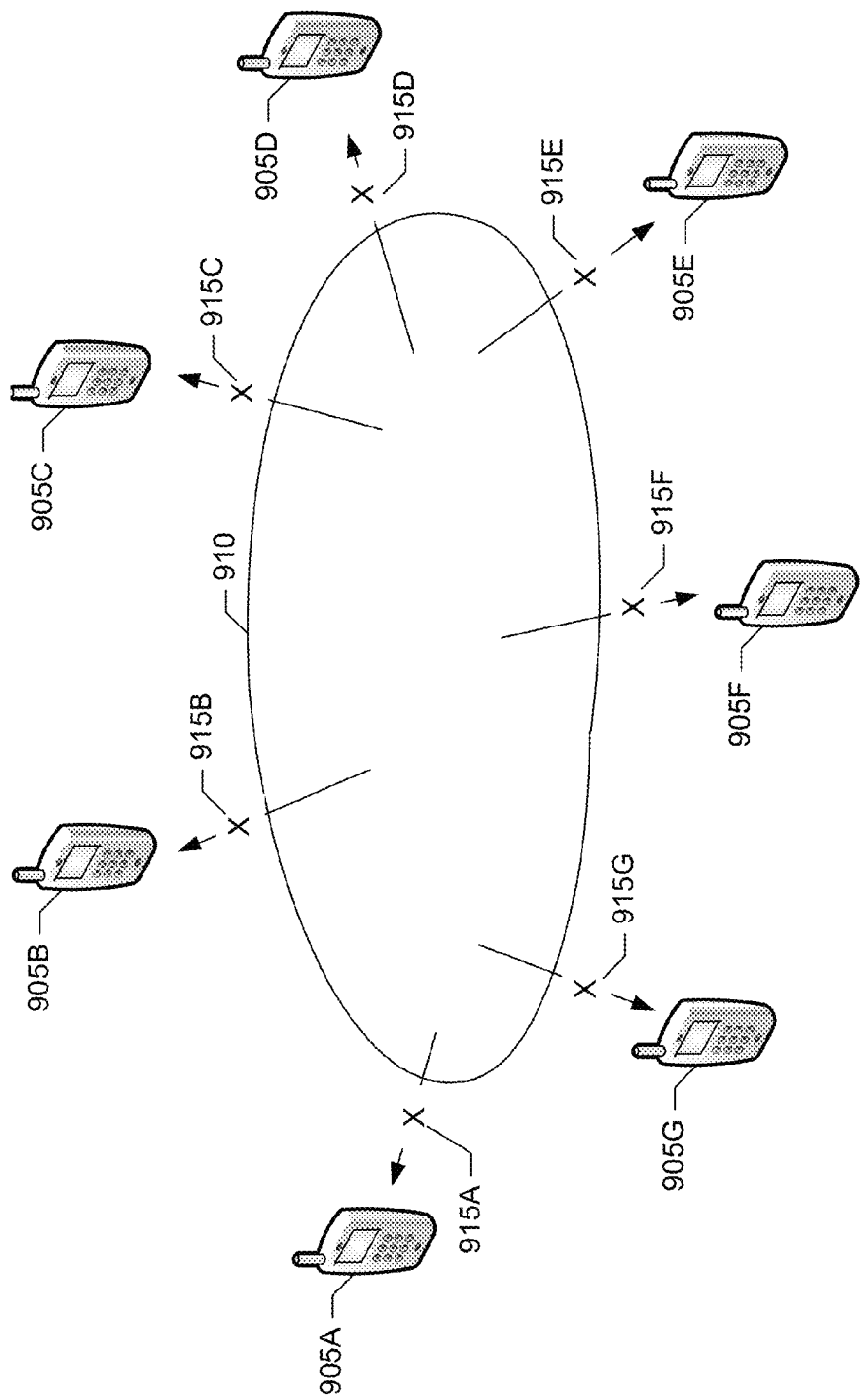
FIG. 9 is a block diagram illustrating identification of a network coverage hole using the example methods and apparatus described herein.

FIG. 9 illustrates identifying a network coverage hole using the process 800 of FIGS. 8A-B. In the example of FIG. 9, multiple UEs 905A-G are transitioning from an out of coverage region 910 (also referred to as a network coverage hole 910) back to one or more regions of coverage. Each of the UEs 905A-G is configured to perform the process 800 and has received MDT configuration including at least a back to coverage threshold as described above. Because each UE 905A-G is configured with a back to coverage threshold, the UEs 905A-G begin performing MDT PDP measurements according to the process 800 upon leaving the out of coverage region 910 (represented by the directed lines in FIG. 9). Additionally, each UE 905A-G initiates a location request procedure and obtains a respective positioning fix 915A-G upon leaving the out of coverage region 910 (e.g., corresponding to block 856 of the process 800). As illustrated in FIG. 9, the network can use the set of positioning fixes 915A-G to map the out of coverage region 910.

Figure 10:
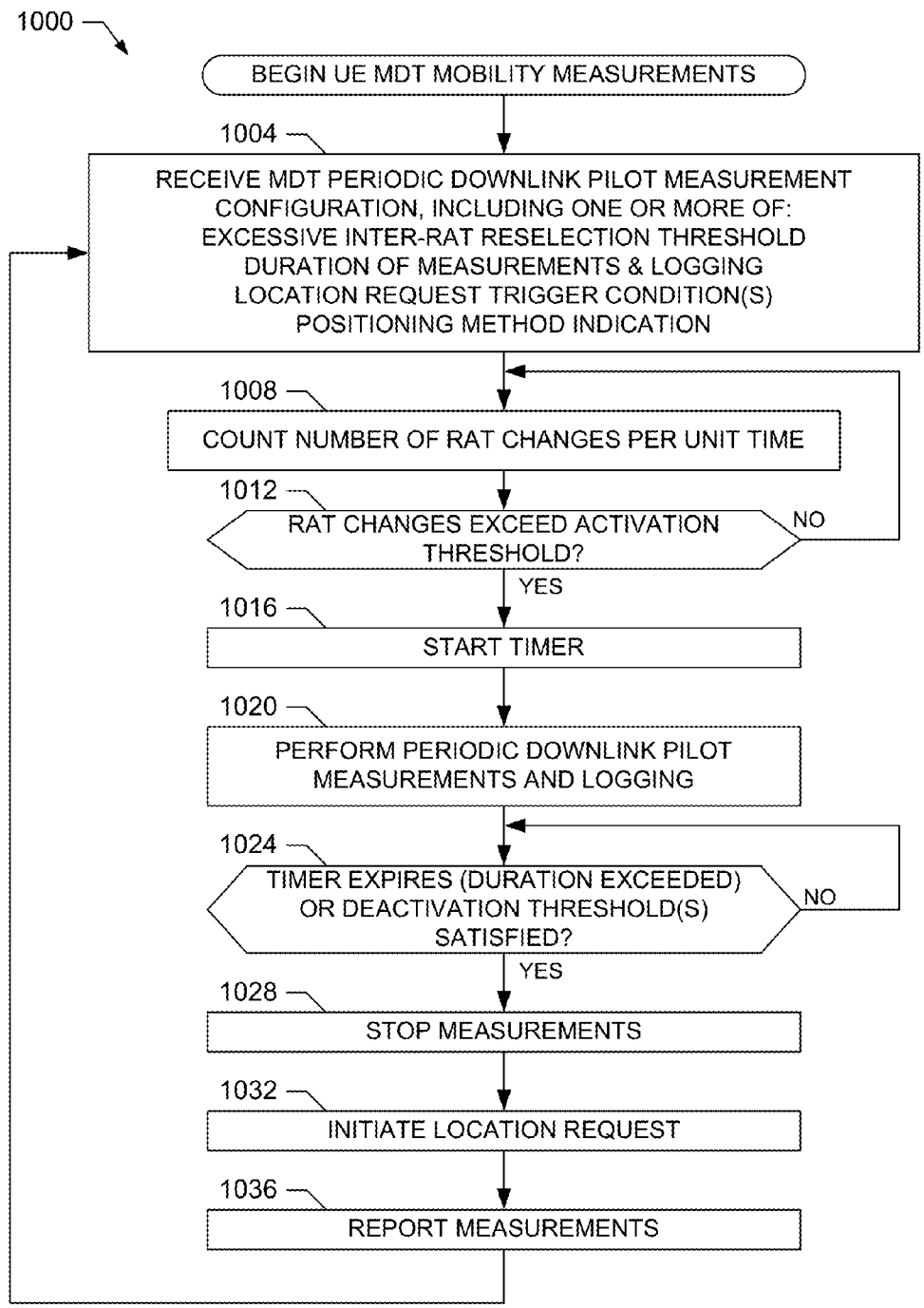
FIG. 10 is flowchart representative of a first example process that may be performed to implement MDT mobility measurements in the UE of FIG. 4.

A first example process 1000 that may be performed by the UE 105 to implement MDT mobility measurements is illustrated in FIG. 10. The process 1000 measures reselections between radio access technologies (RATs) (i.e., inter-RAT reselections), and may be used to identify problematic regions exhibiting, for example, ping-pong problems in which the UE 105 transitions excessively among RATs. The process 1000 may be used to implement at least portions of the generic process 600 of FIG. 6. Turning to FIG. 10, the process 1000 begins at block 1004 at which the UE 105 obtains MDT measurement configuration information which includes an excessive inter-RAT reselection activation threshold (e.g., to be used as an activation condition), a specified duration of measurement and logging (e.g., to be used as a deactivation condition), one or more excessive inter-RAT reselection deactivation thresholds, one or more location request criteria (e.g., such as one or more trigger conditions), a positioning method indication, etc. Then, at block 1008, the UE 105 counts a number of RAT changes per a unit of time (e.g., because the excessive inter-RAT reselection activation threshold was included in the configuration information). If the counted number of RAT changes exceeds the activation threshold value (block 1012), the UE 105 starts a timer (block 1016), and initiates PDP measurement and logging (block 1020). Although not shown, the UE's mobility status (e.g., motion, velocity, etc.) may also be considered when determining the threshold for triggering the counting of RAT changes at block 1008.

When the timer expires (block 1024), or the number of RAT changes per unit of time exceeds a first excessive inter-RAT reselection deactivation threshold or the number of RAT changes per a unit of time falls below a second excessive inter-RAT reselection deactivation threshold (block 1024), the UE stops measurement and logging (block 1028) and stores the available PDP measurement results. For example, if the first excessive inter-RAT reselection deactivation threshold is satisfied, the UE 105 likely experienced the inter-RAT ping pong issue. However, if the second excessive inter-RAT reselection deactivation threshold is satisfied, the inter-RAT cell reselection behavior of the UE 105 likely returned to normal. If location information whose resolution is finer than cell identity level is not available, the UE initiates a location request procedure (block 1032), which can be triggered if location request criteria is configured and one or more or, alternatively, all of the configured location request criteria are satisfied. The UE 105 may initiate location request procedure when inter-RAT reselection occurs between the two or three most frequently reselected cells. Whether and how the positioning procedure at block 1032 is initiated may depend on the MDT measurement and logging configuration information provided by the network. The UE 105 then reports the logged measurement data and positioning information at block 1036. The process 1000 can be beneficial when, for example, idle mode signal reduction (ISR) is employed in the 3GPP communication system 100, because the network may not be able to detect frequent RAT changes made by the UE 105. Even when the ISR is not used, the process 1000 can still be used to identify a problematic area associated with excessive RAT reselections.

Figure 11:
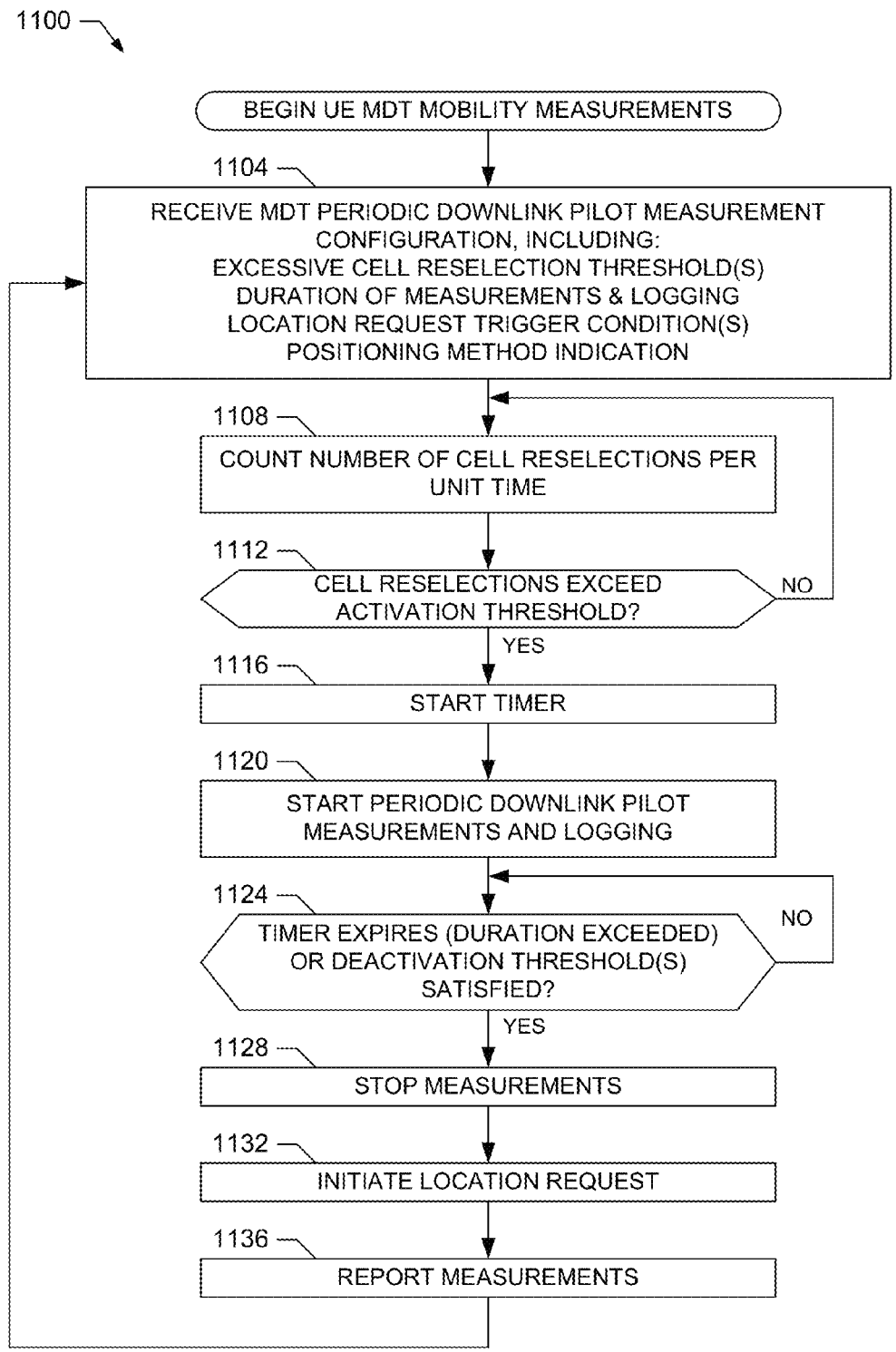
FIG. 11 is flowchart representative of a second example process that may be performed to implement MDT mobility measurements in the UE of FIG. 4.

A second example process 1100 that may be performed by the UE 105 to implement MDT mobility measurements is illustrated in FIG. 11. The process 1100 measures intra-RAT (intra-frequency or inter-frequency) cell reselections, and may be used to identify problematic regions exhibiting, for example, ping-pong problems in which the UE 105 transitions excessively among cells in a particular RAT. The process 1100 may be used to implement at least portions of the generic process 600 of FIG. 6. Turning to FIG. 11, the process 1100 begins at block 1104 at which the UE 105 obtains MDT measurement configuration information including one or more excessive cell reselection activation thresholds (e.g., to be used as activation conditions, and which could include different thresholds for intra-frequency vs. inter-frequency cell reselections), a specified duration of measurement and logging (e.g., to be used as a deactivation condition), one or more excessive cell reselection deactivation thresholds, one or more location request criteria (e.g., such as one or more trigger conditions), a positioning method indication, etc. Then, at block 1108, the UE 105 counts a number of cell reselections per a unit of time (e.g., because an excessive cell reselection activation threshold was included in the configuration information). If the counted number of cell reselections exceeds the activation threshold value (block 1112), the UE 105 starts a timer (block 1116), and initiates PDP measurement and logging (block 1120). Although not shown, the UE's mobility status (e.g., motion, velocity, etc.) may also be considered when determining the threshold for triggering the counting of cell reselections at block 1108.

When the timer expires (block 1124), or the number of cell reselections exceeds a first excessive cell reselection deactivation threshold or the number of cell reselections falls below a second excessive cell reselection deactivation threshold (block 1124), the UE 105 stops measurement and logging (block 1128) and stores the available PDP measurement results. If location information whose resolution is finer than cell identity level is not available, the UE 105 initiates a location request procedure (block 1132) if one or more location request criteria are satisfied. For example, one location request criteria may be that the number of cell reselections per unit of time exceeds the first deactivation threshold. Such a location request can be triggered when the UE 105 performs cell reselection between the two or three most frequently reselected cells. Whether and how the positioning procedure at block 1132 is initiated may depend on the MDT measurement and logging configuration information provided by the network. The UE 105 then reports the logged measurement data and positioning information at block 1136.

Figure 12:
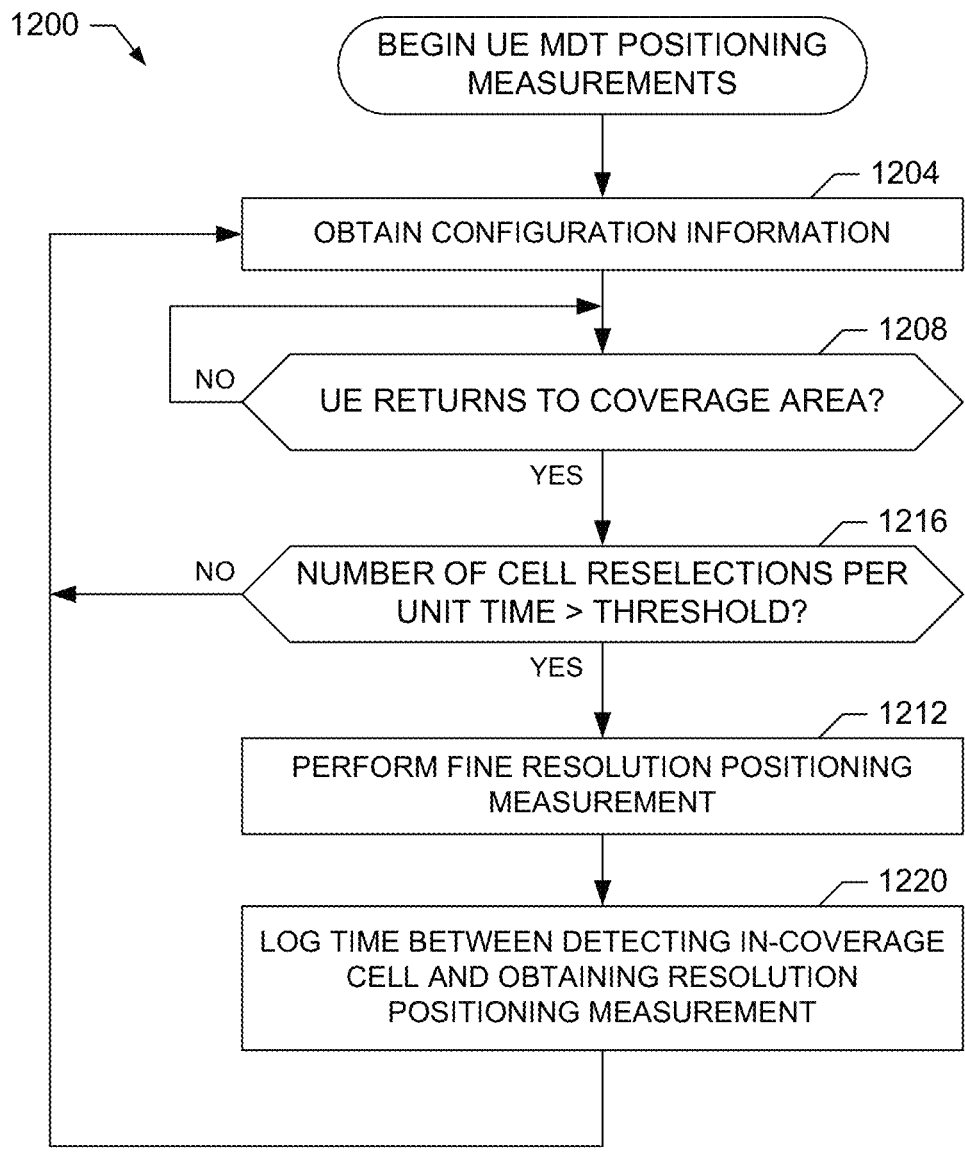
FIG. 12 is a flowchart representative of a first example process that may be performed to implement MDT positioning measurements in the UE of FIG. 4.

A first example process 1200 that may be performed by the UE 105 to implement MDT positioning measurements is illustrated in FIG. 12. The process 1200 may be used to implement at least portions of the generic process 600 of FIG. 6. Positioning/location measurements or estimates should have sufficiently fine resolution to identify coverage holes, such as the coverage hole 910 illustrated in FIG. 9. However, it is not desirable to keep the UE positioning hardware active for an extended time due to the impact on UE battery life. In addition, because UEs are usually mobile, latency of acquiring location information should be sufficiently small to enable the edge of a coverage hole to be identified accurately (e.g., before the UE has moved a significant distance from the edge of the coverage hole).

With such considerations in mind, the process 1200 can be used to perform finer resolution positioning techniques, such as GPS/GNSS or OTDOA, only when needed or at the relevant times for detecting coverage issues. For example, and with reference to the example of FIG. 9, the process 1200 obtains positioning configuration information at block 1204, which causes the UE 105 to perform finer resolution positioning when the UE 105 finds a suitable cell after being in a limited camping state or out of coverage (blocks 1208 and 1212) and, for example, any location request criteria, if such criteria are configured, are met. Because the UE 105 cannot obtain assistance data when the UE 105 is out of coverage, the process 1200 causes the UE 105 to perform positioning measurements when the UE 105 comes back to coverage area rather than when the UE 105 goes out of coverage. By collecting such location information from many UEs, the operator of the 3GPP communication system 100 can identify a coverage hole in its network, such as the coverage hole 910 of FIG. 9.

To determine regions associated with excessive ping-ponging between cells, the process 1200 causes the UE 105 to perform finer resolution positioning only when the configured location request criteria are met, which in the illustrated example corresponds to cell reselection occurring between a particular number (e.g., two or three) of the most reselected cells after exceeding a threshold in terms of number of reselections per unit of time (block 1216). Additionally, the UE 105 logs the time between detecting the in-coverage cell and the positioning information being available (block 1220). This time, along with other mobility-related information, can help the operator evaluate the accuracy of coverage hole edge (e.g., by determining how far the UE 105 may have moved since determining the positioning information).

Figure 13:
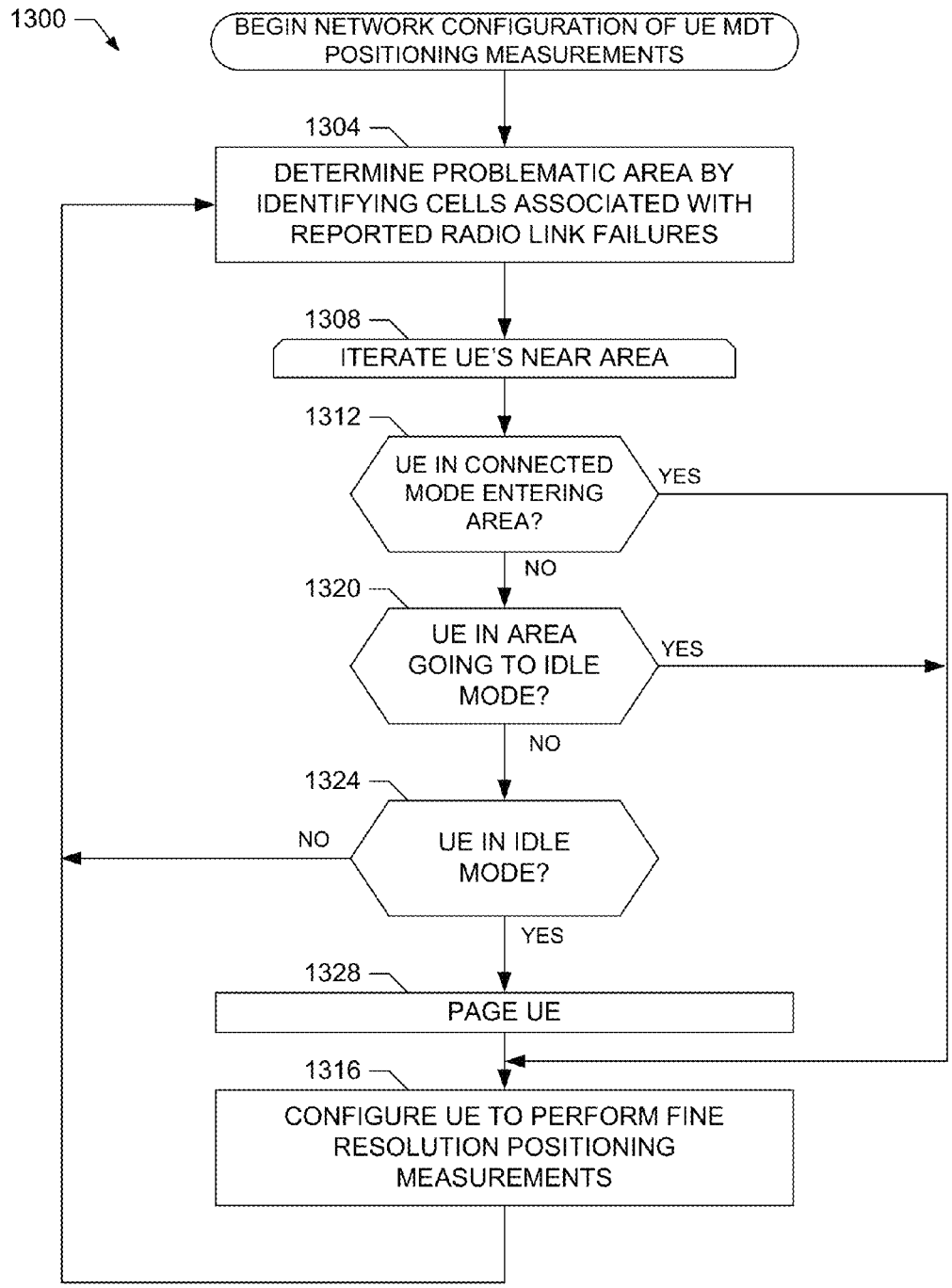
FIG. 13 is a flowchart representative of an example process that may be performed by the network element of FIG. 5 to configure MDT positioning measurements in the UE of FIG. 4.

An example process 1300 that may be performed by a network element, such as the eNB 305, to configure MDT positioning measurements in the UE 105 is illustrated in FIG. 13. For example, the process 1300 may be used to configure the process 1200 to be performed in the UE 105, or may be used as an alternative to the process 1200. The process 1300 may be used to implement at least portions of the generic process 700 of FIG. 7. Turning to FIG. 13, the process 1300 implements a two-phase positioning measurement technique, with the first phase occurring at block 1304 at which the network (e.g., via the network manager 210 or 310) identifies a problematic area (e.g., such as the coverage hole 910) at a cell identity level by taking statistics of radio link failures and then creating a list of cells associated with the area. Then, in the second phase, the eNB 305 iterates through UEs near the identified problematic area (block 1308) and when a UE (e.g., the UE 105) in connected mode is entering the area (block 1312), the network may configure MDT measurement and logging and activate finer resolution positioning (block 1316). For cell selection and reselection metrics, the eNB 305 may configure MDT measurement and logging to be performed in idle mode just before a UE (e.g., the UE 105) in that area is going back to the idle mode (block 1320). Additionally the network may page an idle mode UE in the identified problematic area (blocks 1324 and 1328) to configure MDT measurements, logging and finer resolution positioning via dedicated signaling (block 1316), and then allow the UE to go back to idle mode. Additionally or alternatively, for UEs in idle mode, the network can broadcast configuration information for MDT measurement and logging in system information in the cells within and/or surrounding the problematic area (not shown). Such use of system information to broadcast MDT configuration in and/or around a problematic area can avoid the need to the network to iterate through UEs near the identified problematic area (block 1308) to configure UEs in connected mode for MDT measurements.

Figure 14:
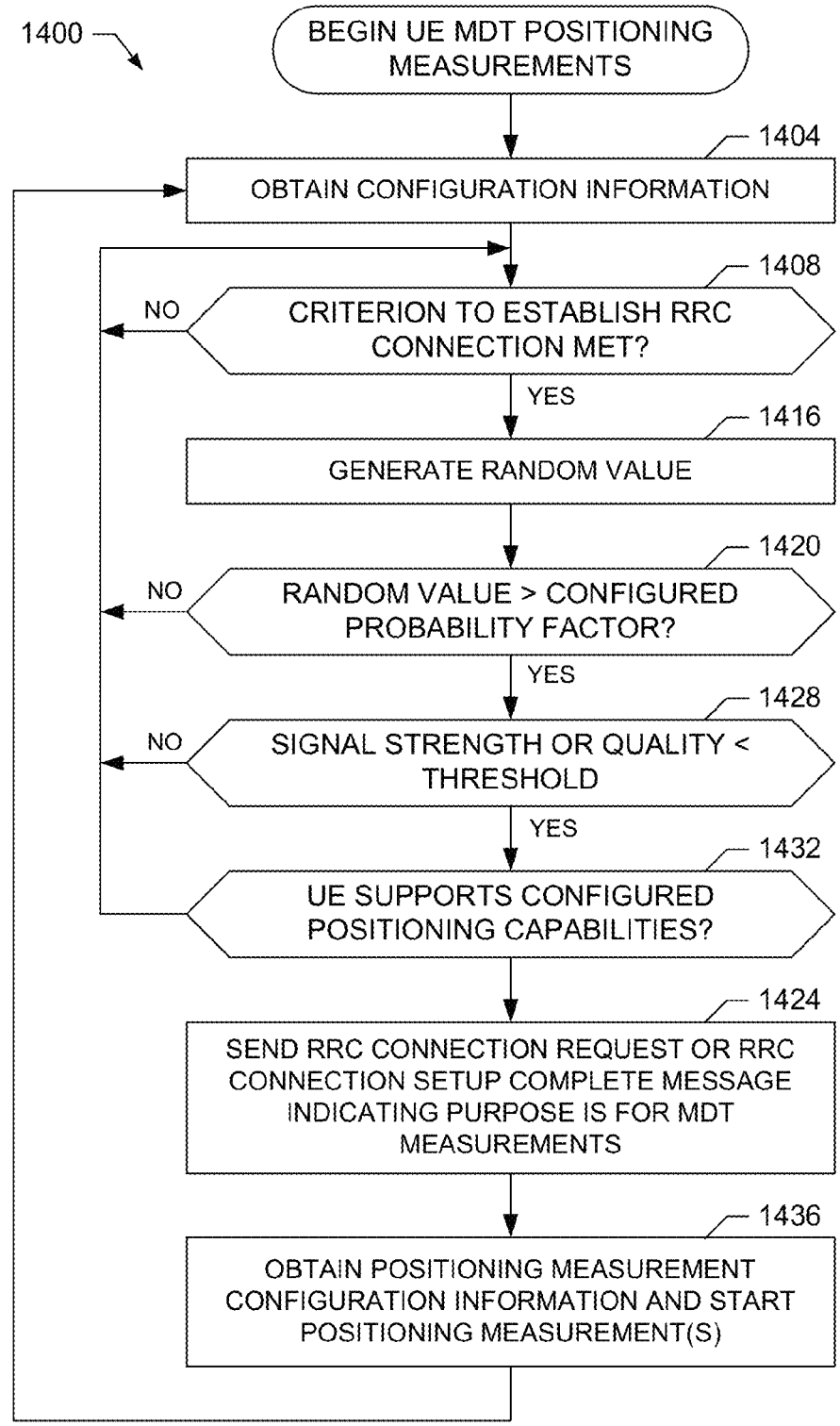
FIG. 14 is a flowchart representative of a second example process that may be performed to implement MDT positioning measurements in the UE of FIG. 4.

A second example process 1400 that may be performed by the UE 105 to implement MDT positioning measurements is illustrated in FIG. 14. The process 1400 may be used to implement at least portions of the generic process 600 of FIG. 6. The process 1400 obtains positioning configuration information from the network at block 1404, which causes the UE 105 to establish an RRC connection when one or more specified criteria is met (block 1408). Examples of such criteria (e.g., which can be specified using an event identity/descriptor) include the UE 105 returning back to the coverage, a number of reselections exceeding a threshold, the UE 105 entering a certain area corresponding to, for example, a list of certain cells, a UTRAN registration area (URA), a location area (LA), a routing area (RA), a tracking area (TA), etc. In the example process 1400, the network specifies a probability factor in the configuration information obtained at block 1404 to limit the number of RRC connections established for MDT purposes. Thus, the UE 105 generates a random number (block 1416) and if the number is higher (or, alternatively, lower) than the specified probability factor (block 1420) the UE transmits an RRC connection request (block 1424). The probability factor value may be included in, for example, system information, reconfiguration messages or an RRC connection release message provided by the network to the UE 105.

If the probability factor is the only criterion used for establishing the RRC connection, a UE near the center of the cell may establish a connection if the random number generated by the UE is higher (or, alternatively, lower) than the specified probability factor. However, a UE near the center of the cell may not be helpful for use in identifying a coverage problem. To cause measurements to be performed mostly by UEs near a cell's edge, in addition to the probability factor, the network may provide threshold values for signal strength, signal quality, path loss, etc., in the configuration information obtained at block 1404 to generally allow only UEs near the cell edge to be able to establish RRC connections for MDT measurement reporting. For example, if a signal strength threshold is configured, the UE 105 measures the signal strength of the serving cell or the camped on cell. If the measurement is better than the threshold (block 1428), the UE 105 will not initiate a RRC connection; otherwise, the UE 105 may be permitted to initiate the RRC connection (block 1424), possibly dependent upon other criteria. For example, the network may also specify a required positioning capability, for example, assisted GPS, OTDOA, etc., in the configuration information obtained at block 1404. If the UE 105 does not have the specified capability (block 1432), the UE 105 will not initiate a RRC connection; otherwise the UE 105 initiates an RRC connection (block 1424).

The RRC connection established at block 1424 for MDT measurement purposes may be distinguished by a specific establishment cause value for MDT measurement in the RRC connection request message or an information element to indicate MDT measurement in the RRC connection setup complete message. When the network receives an RRC connection request or RRC connection setup complete with the MDT indication, the network configures, for example, either of the following options.

Option 1: At block 1436, the UE 105 obtains configuration information to start periodic positioning measurement, such as enhanced cell identity (E-CID), GPS/GNSS, OTDOA, etc. The network may also start measuring the angle of signals received from the UE 105, along with any timing delay, and estimates the location of the UE 105. The network measurement and the UE positioning measurement may be combined to produce more accurate location information.

Option 2: At block 1436, the UE 105 obtains configuration information to start periodic positioning measurement, but in contrast with Option 1, the positioning measurements may be performed in idle mode and measurements are logged rather than reported. Example positioning methods include, for example, E-CID, GPS/GNSS, OTDOA, etc. Assistance data may be provided during configuration, if applicable. Positioning measurements may be started upon releasing the RRC connection or further deferred until a certain condition is met (e.g., such as when the UE goes out of coverage or the UE comes back to the coverage).

With respect to E-CID or OTDOA measurements, the UE 105 may report a certain number of best cells in an RRC connection setup complete message so that the network can select an optimum set of cells for the positioning measurement.

In at least some example operating scenarios, when the processes 1200 and/or 1400 are being performed, if the UE 105 enters a coverage hole (e.g., such as the coverage hole 910), positioning information with finer resolution may be already available with cell measurements, or the UE 105 may start the configured positioning measurement by using assistance data provided with the configuration information to obtain location information immediately, thereby realizing low latency acquisition of location information. In at least some operating scenarios, the assistance data provided to the UE 105 for positioning measurements may become stale due to UE mobility or elapsed time. If the reference cell that provided the assistance data is different from the current camped on cell or serving cell for the UE 105, the assistance data may also become stale. In such scenarios, the UE 105 may need to request fresh assistance data. As such, positioning measurements for MDT can be configured with a validity timer (e.g., 10 minutes) and/or a valid area where the assistance data is valid. The valid area may be specified by a list of cells or URAs.

Another advantage of the preceding positioning measurement techniques is that the positioning technique for MDT purposes can be selected based on the UE's positioning capability. For example, if the UE 105 and the network both support UE-assisted GPS, UE-based GPS and OTDOA, the network could select OTDOA over UE-assisted GPS over UE-based GPS depending upon the amount of assistance data required and the expected time that has elapsed from a first positioning fix.

Figure 15:
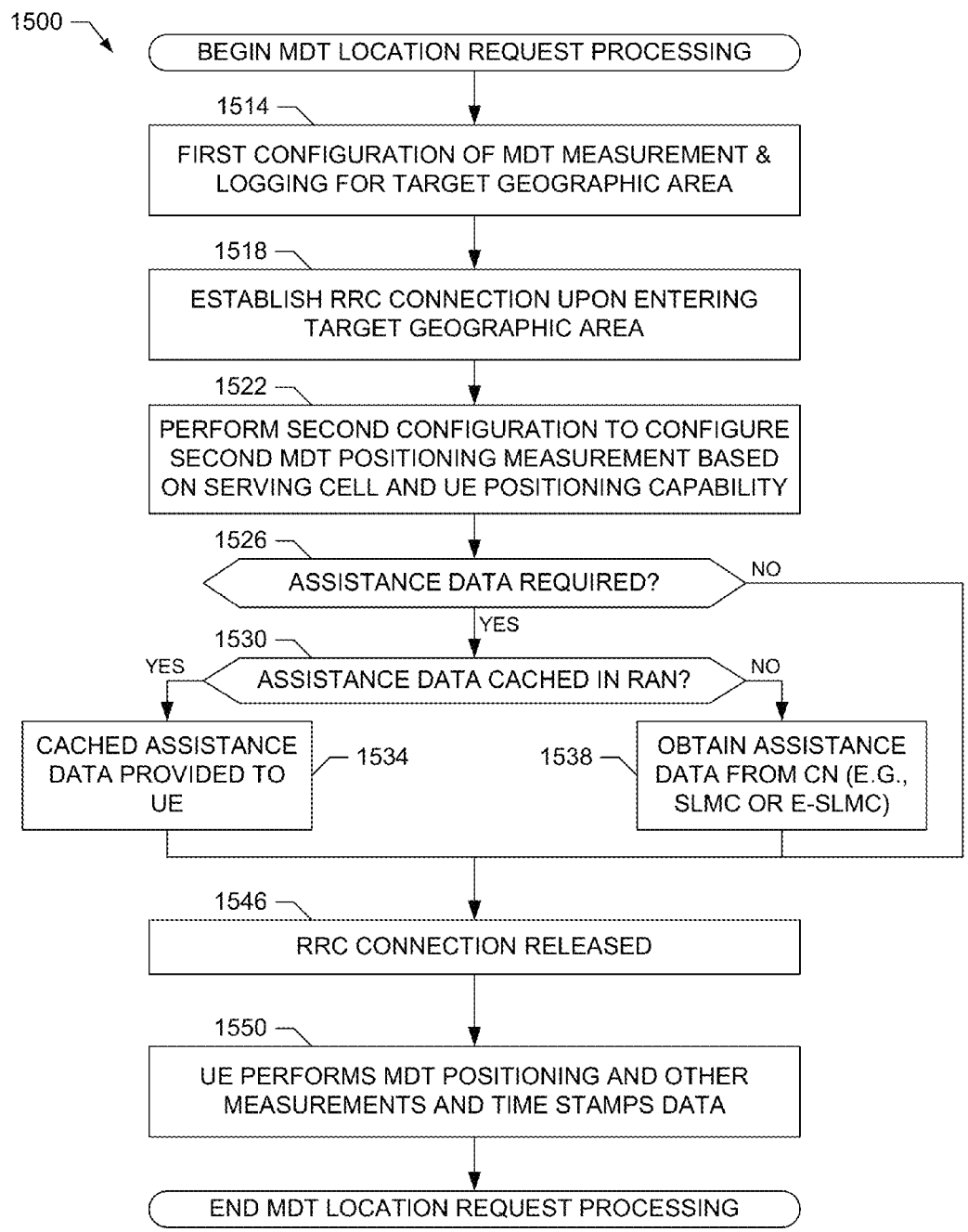
FIG. 15 is a flowchart representative of an example process that may be performed to implement MDT location request processing in the network element of FIG. 5.
Figure 16:
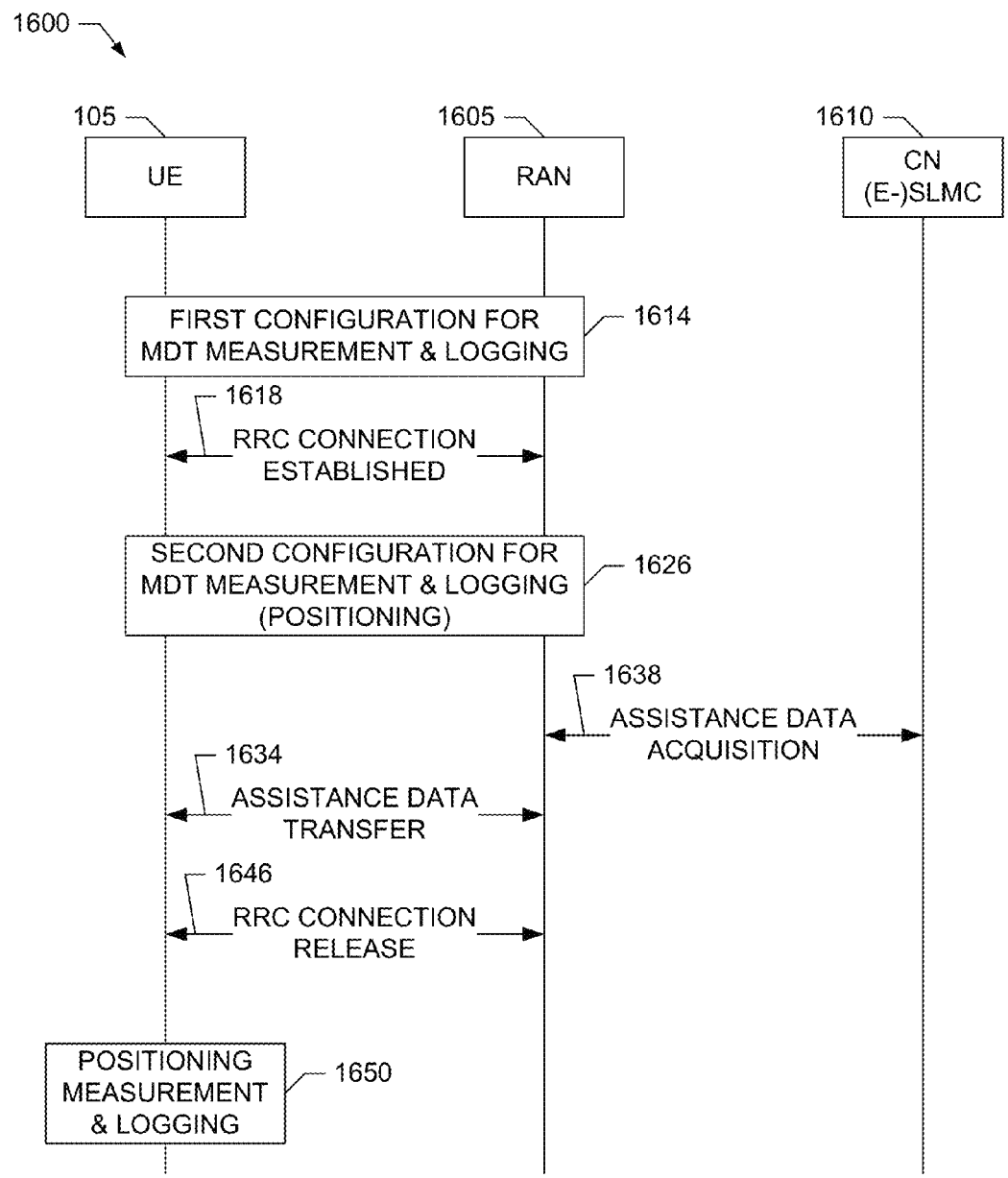
FIG. 16 is an example message sequence diagram corresponding to the process illustrated by the flowchart of FIG. 15.

Some of the preceding examples utilize MO-LR procedures to determine positioning information. An example MO-LR process 1500 that may be used to implement location request processing for MDT measurements in the 3GPP communication system 100 of FIG. 1 is illustrated in FIG. 15. A message sequence diagram 1600 illustrating an example operation of the process 1500 is illustrated in FIG. 16. In at least some operating scenarios, the MO-LR process 1500 is more efficient than conventional MO-LR procedures because the MO-LR process 1500 is managed primarily in the RAN (e.g., represented as the RAN 1605 in FIG. 16), with limited involvement by the core network (CN, which is represented as the CN 1610 in FIG. 16), including the mobile switching center (MSC) and serving GPRS support node (SGSN) in UMTS, the MME and the enhanced serving mobile location center (E-SMLC) in the long term evolution (LTE) enhanced packet core (EPC), etc. Also, the MO-LR process 1500 provides the assistance data to the UE 105 earlier than conventional MO-LR procedures, potentially realizing efficient acquisition of location information with reduced latency.

With reference to both FIGS. 15 and 16, at blocks 1514 and 1614, respectively, the network performs a first MDT measurement (and logging) configuration using, for example, an RRC connection reconfiguration, an RRC connection release, system information, etc. In the illustrated example, the first MDT measurement configuration 1514, 1614 is for a specified target geographic area and configures the UE 105 to establish an RRC connection upon entering the specified geographic area.

Next, at block 1518 the UE 105 enters the specified geographical area and establishes an RRC connection 1618 with an establishment indication that the purpose is for MDT measurement. The MDT measurement establishment indication can be conveyed in an RRC connection request or an RRC connection setup complete message. In response to the MDT measurement establishment indication, the network may decide to bypass authentication or other security procedures. Additionally, the UE 105 may indicate its positioning capability or capabilities, provide measurements of serving and neighboring cells, etc. in the RRC connection setup complete message. In an example implementation, the cell measurements are at least one of signal strength or signal quality of the serving and neighbor cells.

Next, at block 1522 the network determines whether a second MDT configuration or normal radio resource management (RRM) positioning measurements should be performed. IF normal RRM positioning is to be performed, the network configures the appropriate RRM measurements and the process ends (not shown in the figure). If the network decides to perform the second MDT configuration for MDT positioning measurements, the network may include positioning/location request criteria in the MDT configuration depending upon the serving cell and the positioning capability of the UE 105. If assistance data is required (block 1526), the network delivers the assistance data to the UE 105 (represented as block 1626 in FIG. 16). In order to reduce loading of the network, the RAN 1605 (e.g., such as the eNB 305 in LTE or an RNC in UTRAN) may cache assistance data temporarily at each or a subset of cells. If valid assistance data is available for the UE 105 in the RAN 1605 (block 1530), the assistance data is provided to the UE via an assistance data transfer 1634 from the RAN's cache (block 1534). Otherwise, the network requests new assistance data via an assistance data transfer 1638 from the CN 1610 (e.g., from the SMLC or RNC in UTRAN or from the E-SLMC in EPC/LTE using LTE positioning protocol A (LPPa)) to the RAN 1605, which then delivers the assistance data to the UE 105 (block 1538).

In the second MDT configuration beginning at blocks 1522, 1626, the network may also configure positioning measurement/estimation and logging via a measurement control message, an RRC connection reconfiguration message, an RRC connection release message or a special purpose message at block 1522. The message may contain the assistance data rather than sending it separately as in the assistance data transfer 1634. The message used to perform the second MDT measurement specifies conditions to activate measurement and reporting/logging, a duration of the measurement operation, etc. As described above, the activation condition may be upon going out of coverage, coming back to coverage, going back to idle state, etc.

Next, at block 1546 the network performs an RRC connection release 1646. Then, at blocks 1550, 1650, the UE 105 starts performing positioning measurements and records the measurements with other cell measurements and time stamps using any of the processes 1200 or 1400, or any other positioning/location measurement process.

Figure 17:
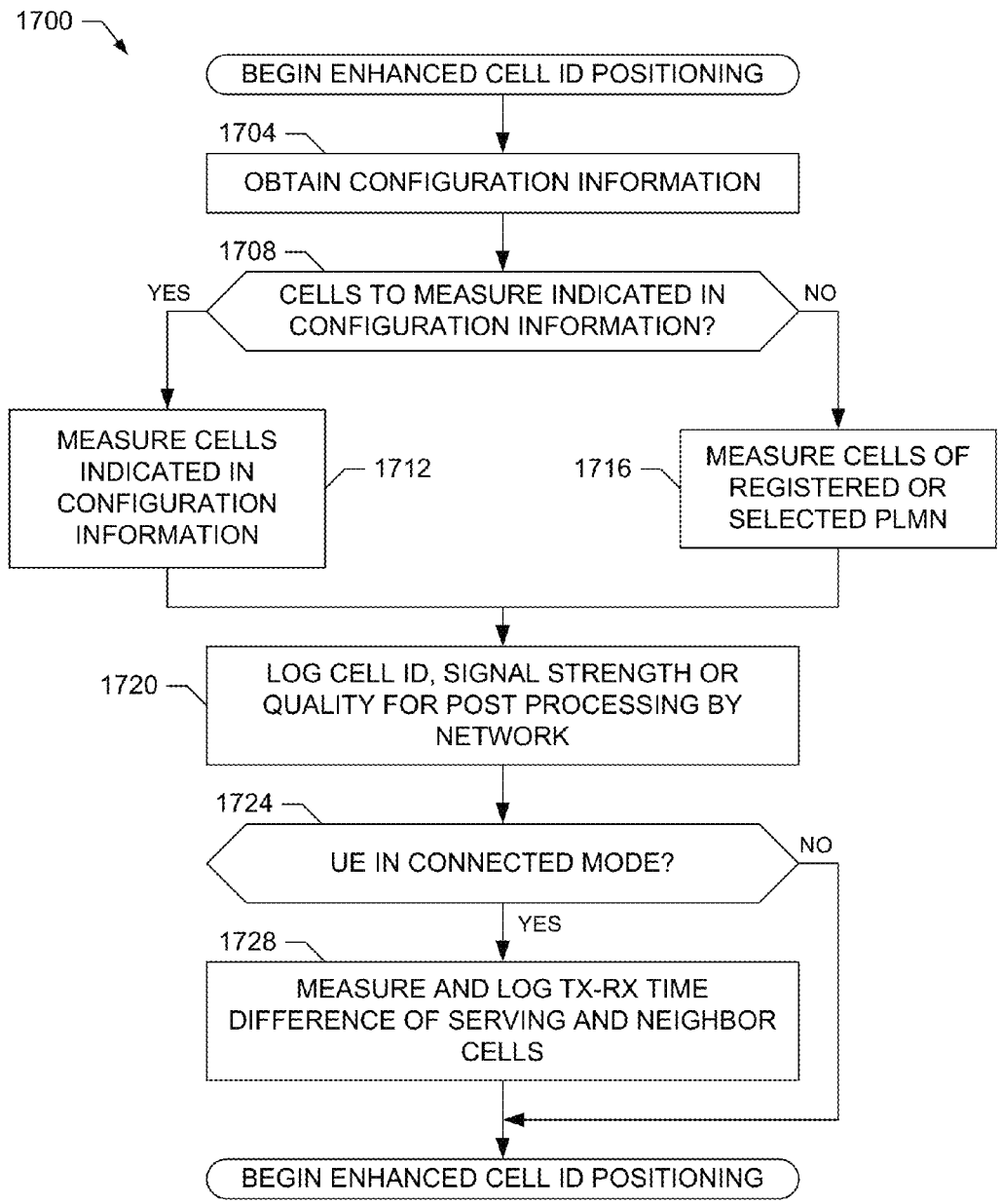
FIG. 17 is a flowchart representative of an example process that may be performed to implement enhanced cell identity (ID) positioning in the UE of FIG. 4.

An example process 1700 that may be performed by the UE 105 to perform enhanced cell identity (E-CID) positioning measurements is illustrated in FIG. 17. The process 1700 may be used to implement at least portions of the generic process 600 of FIG. 6. For E-CID positioning using the process 1700, the UE 105 obtains positioning configuration information as described above (block 1704). Then, if the configuration information includes a set of cells to be measured for E-CID (block 1708), the UE 105 measures the cells indicated by the network (1712). If no cells are indicated by the network (block 1708), the UE 105 may choose a set of cells that have been registered or belong to a selected public land mobile network (PLMN) (block 1716). The UE 105 then records the cell identity and at least one of the signal strength or the signal quality of the measured cell(s) for post processing (block 1720). If the UE 105 is in connected mode (block 1724), the UE may measure and record the TX-RX time difference of the serving and neighbor cells in addition to the information recorded at block 1720.

Figures 18, 19:
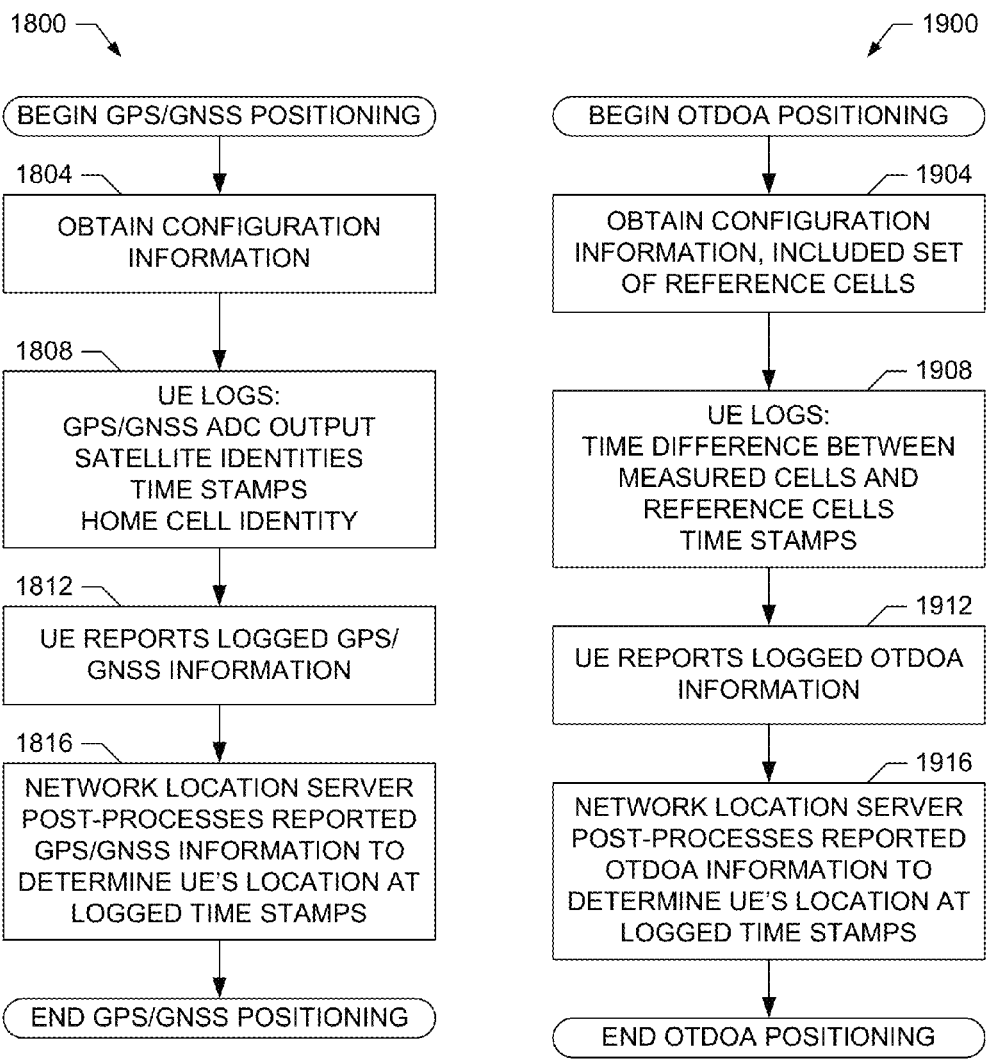
FIG. 18 is a flowchart representative of an example process that may be performed to implement global positioning system (GPS)/global navigation satellite system (GNSS) positioning in the UE of FIG. 4.
FIG. 19 is a flowchart representative of an example process that may be performed to implement observed time difference of arrival (OTDOA) positioning in the UE of FIG. 4.

An example process 1800 that may be performed by the UE 105 to perform GPS/GNSS positioning measurements is illustrated in FIG. 18. The process 1800 may be used to implement at least portions of the generic process 600 of FIG. 6. For GPS/GNSS positioning using the process 1800, the UE 105 obtains positioning configuration information as described above (block 1804). Then, the UE 105 logs the GPS/GNSS analog-to-digital converter (ADC) output within its GPS/GNSS receiver, satellite identity information, one or more timestamps, an identity of the serving (home) cell or camped on cell, etc. (block 1808). The UE 105 then reports the logged information (block 1812). Later, a network location server can scan the recorded data to detect signals from GPS satellites with the knowledge of time and cell wide level location information (block 1816). If a sufficient number of satellites are detected, the network location server can calculate the position of the UE 105 (block 1816).

An example process 1900 that may be performed by the UE 105 to perform OTDOA positioning measurements is illustrated in FIG. 19. The process 1900 may be used to implement at least portions of the generic process 600 of FIG. 6. For OTDOA positioning using the process 1900, the UE 105 obtains positioning configuration information as described above (block 1904). The UE 105 then determines and logs frame time differences between target cells and the reference cells contained in assistance data or other cells that the UE 105 chooses, along with timestamps, for post processing (block 1908). The UE 105 then reports the logged information (block 1912). Later, the network location server post-processes the reported OTDOA information to determine the location of the UE at the logged timestamps.

In the preceding examples, the network location server may need to process positioning measurements within a certain period after measurement acquisition in order to calculate accurate position estimates. The UE 105 may establish an RRC connection with the specific establishment cause "MDT report" or indicate "MDT report" in a RRC connection setup complete to provide the positioning measurements.

Figure 20:
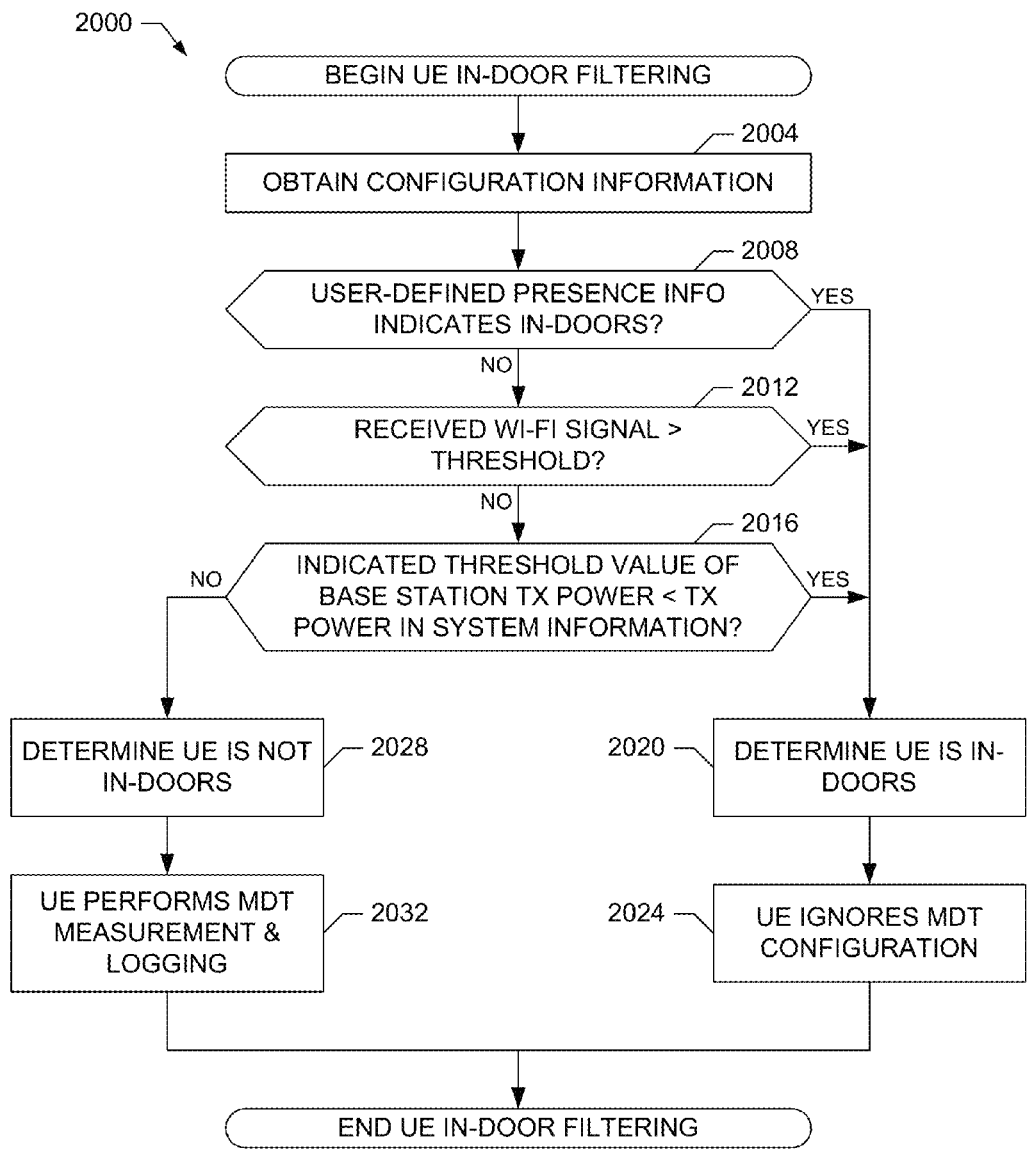
FIG. 20 is a flowchart representative of an example process that may be performed to implement in-door MDT measurement filtering in the UE of FIG. 4.

For coverage optimization, an operator's primary interest is likely to be macro (i.e., outdoor) coverage. As such, in some example scenarios, MDT measurements and logging or reporting should be avoided when the UE 105 is indoors, and/or the eNB 305 or the MDT network manager 310 should be able to avoid or filter measurement data corresponding to operation of the UE 105 indoors. An example process 2000 that may be performed by the UE 105 to perform such indoor filtering is illustrated in FIG. 20. The process 2000 may be used to implement at least portions of the generic process 600 of FIG. 6. For indoor filtering using the process 2000, the UE 105 receives configuration information as described above (block 2004). The UE 105 then determines whether user defined presence information, such as an at-work or an at-home user-selectable operating mode, may be utilized to distinguish whether the UE 105 is operating indoors (block 2008). Additionally or alternatively, the UE 105 may determine it is operating indoors if the UE 105 receives WiFi signals whose reception level is higher than a threshold value (block 2012). The threshold value may be included in the configuration information obtained at block 2004. In the case of operator network indoor coverage, smaller size base stations are often used and their transmission power may be configured smaller than that of macro base stations. An operators may indicate (e.g., via the configuration information obtained at block 2004) a threshold value of the transmission power of such an indoor base station. The UE 105 may determine it is operating indoors if the threshold value is lower than the transmission power indicated in the system information of the camped on cell or the serving cell (block 2016). When the UE 105 determines it is operating indoors (block 2020), the UE 105 rejects or ignores the configuration of MDT measurement and logging or does not establish an RRC connection to report logged MDT measurements (block 2024). Conversely, when the UE 105 determines it is not operating indoors (block 2028), the UE 105 performs MDT measurement and logging or does establish an RRC connection to report logged MDT measurements (block 2032).

Figure 21:
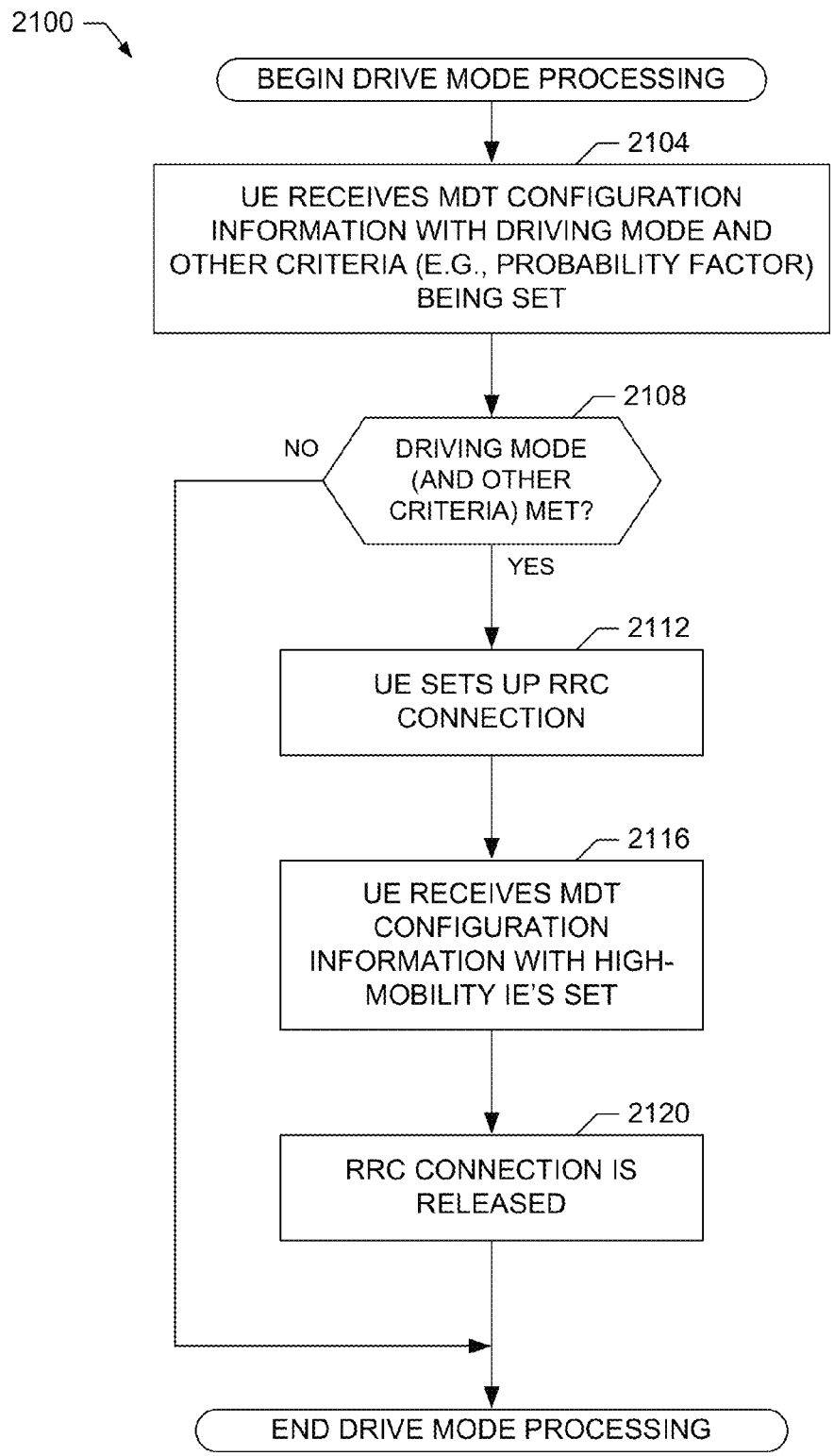
FIG. 21 is a flowchart representative of an example process that may be performed to implement drive mode MDT measurement filtering in the UE of FIG. 4.

In some cases, operators may employ different MDT measurement configurations when the UE 105 is operating in a drive mode (e.g., operating with high mobility). For example, the UE 105 can inform the network that it is going to enter high mobility when a user sets the UE to driving mode. In response, the network can configure MDT measurements for high mobility. Additionally, if the network is interested in high mobility MDT measurements, when a UE (e.g., the UE 105) establishes an RRC connection with a high mobility indication present, the network can select the particular UE and configure it to perform MDT measurements for high mobility. With the foregoing in mind, an example process 2100 that may be performed to support such drive mode processing is illustrated in FIG. 21. The process 2100 begins with the UE 105 receiving MDT configuration information as described above (block 2104). In the illustrated example the MDT configuration information is received at block 2104 from one or more cells located close to a highway and broadcasting the MDT configuration in system information. The MDT configuration information includes reporting criteria, such as a driving mode criterion indicating that the UE should set up an RRC connection if it is set to driving mode, as well as other reporting criteria, such as a reporting probability factor.

Next, if the UE 105 is set to driving mode and any other reporting criteria are met (block 2108), the UE 105 sets up an RRC connection (block 2112). Then, the network provides and the UE receives high mobility MDT configuration information (e.g., examples of which are listed in Table 1) (block 2116). The RRC connection is then released (block 2120) and the UE is able to perform MDT measurement and logging based on the received high mobility configuration information.

The UE 105 then determines that a driving mode user input has been set or otherwise determines the UE 105 is operating in a high mobility condition (block 2108). Next, to avoid processing temporary out of coverage cases (e.g., such as may occur when traveling in an elevator), the UE 105 sets a timer (block 2112). If the timer expires (block 2116) and the UE 105 is not still in the driving mode or the high mobility condition (block 2120), the UE 105 can ignore the apparent transient out of coverage condition (block 2124). However, if the UE 105 is still in the driving mode or the high mobility condition when the timer expires (block 2120), the UE 105 signals the driving mode setting by establishing an RRC connection (e.g., with an MDT measurement establishment cause and a driving mode indication being set) (block 2128). The UE 105 then receives MDT measurement and reporting/logging configuration with the appropriate driving mode/high mobility information elements (IEs) being set (block 2132). Alternatively when an MDT measurement is already configured, the UE 105 may decide not to comply with the configured MDT measurements/reporting if driving mode (or high mobility) is set.

It will be readily appreciated that the UE 105 can be configured to perform any, some, all or portions of the processes illustrated in FIGS. 6, 8A-B, 10-12, 14, 15 and 17-21. Similarly, it will be appreciated that a network element providing base station functionality, such as the eNB 305, can be configured to perform any, some, all or portions of the processes illustrated in FIGS. 7, 13 and 15.

Example MDT configuration information in the form of 3GPP information elements (IEs) that can be conveyed via system information, RRC signaling (e.g., RRC connection reconfiguration messages), measurement control messages, etc., are listed in Table 1. Generally, once MDT measurements are configured (e.g., in connected mode) via the MDT IE(s) in Table 1, the configuration remains valid even when the UE 105 enters idle mode.

TABLE 1

| IE No | IE Name | Explanation |
| --- | --- | --- |
| 1. | Validity state | States in which this configuration is valid, for example, idle mode, connected mode, etc. |
| 2.1 | Activation Conditions (Measurement Threshold Values, etc) | If one or more conditions shown below are satisfied the UE activates the measurement and logging/reporting |
| 2.1.1 | Target area | Target area for MDT measurement. The area may be specified as a list of cells, URAs, LAs, RAs or TAs. In the case of a list of cells, the cells are specified by at least one of physical cell identity, global cell id, frequency and RAT (Radio Access Technology). |
| 2.1.2 | Activating threshold going out of coverage | Threshold values to activate MDT measurement and logging when the UE goes out of coverage area. The threshold could be at least one of signal strength or quality, such as CPICH RSCP and CPICH Ec/Io for UTRA frequency division duplex (FDD), or RSRP and RSRQ for E-UTRA. Different threshold values may be specified depending on the UE mobility state. |
| 2.1.3 | Activating threshold back to coverage | Threshold values to activate measurement and logging when the UE moves back to coverage area. The threshold could be at least one of signal strength or quality, such as CPICH RSCP and CPICH Ec/Io for UTRA FDD, or RSRP and RSRQ for E-UTRA. Different threshold values may be specified depending on the UE mobility state. |
| 2.1.4 | Activating threshold for excessive intra frequency cell reselections | The threshold value is a number of cell reselections per unit of time to start measurement and logging. Different threshold values may be specified depending on the UE mobility state. |
| 2.1.5 | Activating threshold for excessive inter frequency cell reselections | The threshold value is a number of cell reselections per unit of time to start measurement and logging. Different threshold values may be specified depending on the UE mobility state. |

TABLE 1-continued

| IE No | IE Name | Explanation |
|---|---|---|
| 2.1.6 | Activating threshold for excessive inter RAT frequency cell reselections | The threshold value is a number of cell reselections per unit of time to start measurement and logging. Different threshold values may be specified depending on the UE mobility state. |
| 2.1.7 | Measurement probability factor | When measurement configuration is performed in idle mode, the UE draws a random number. If the number is less (or, alternatively, more) than the measurement probability factor, the UE ignores the measurement configuration. |
| 2.1.8 | Positioning capabilities | When measurement configuration is performed in idle mode, if the UE positioning capabilities do not match the indicated positioning capabilities, the UE ignores the measurement configuration. |
| 2.1.9 | Access classes | When measurement configuration is performed in idle mode, if the access class of the UE does not match the indicated access classes, the UE ignores the measurement configuration. |
| 2.2 | Deactivation Conditions (Measurement Threshold Values, etc) | If one or more conditions shown below are satisfied the UE deactivates the measurement and logging/reporting |
| 2.2.1 | Target area | Target area for MDT measurement. The area may be specified as a list of cells, URAs, LAs, RAs or TAs. In the case of a list of cells, the cells are specified by at least one of physical cell identity, global cell id, frequency and RAT (Radio Access Technology). |
| 2.2.2 | First and second deactivating threshold going out of coverage | Threshold values to deactivate measurement and logging when the UE goes out of overage area. The threshold could be at least one of signal strength or quality, such as CPICH RSCP and CPICH Ec/Io for UTRA FDD, or RSRP and RSRQ for E-UTRA. Different threshold values may be specified depending on the UE mobility state. |
| 2.2.3 | First and second deactivating threshold back to coverage | Threshold values to deactivate measurement and logging when the UE moves back to overage area. The threshold could be at least one of signal strength or quality, such as CPICH RSCP and CPICH Ec/Io for UTRA FDD, or RSRP and RSRQ for E-UTRA. Different threshold values may be specified depending on the UE mobility state. |
| 2.2.4 | First and second threshold for excessive intra frequency cell reselections | The threshold value is a number of cell reselections per unit of time to stop measurement and logging. Different threshold values may be specified depending on the UE mobility state. |
| 2.2.5 | First and second threshold for excessive inter frequency cell reselections | The threshold value is a number of cell reselections per unit of time to stop measurement and logging. Different threshold values may be specified depending on the UE mobility state. |
| 2.2.6 | First and second threshold for excessive inter-RAT frequency cell reselections | The threshold value is a number of cell reselections per unit of time to stop measurement and logging. Different threshold values may be specified depending on the UE mobility state. |
| 2.2.7 | Duration of measurement and logging | In seconds (e.g., 0, 5, 10, 30, 60, 120, 300, 600, 1800). |
| 2.2.8 | Delete on deactivation | If configured, the UE deletes measurements recorded from its log since the corresponding activation if the deactivation condition with the first deactivation threshold is satisfied. |
| 3. | Reporting Criteria | If one or more criteria or all of the criteria shown below are satisfied the UE establish RRC connection with indication of MDT measurement. |
| 3.1 | Event identity (or event descriptor) | One or more of the following: "out of coverage", "limited camping", "in target geographic area", "exceeding number of cell reselections" |
| 3.2 | Reporting range (upper and/or lower limits) | For example, if duration of being out of coverage is not within the specified range, the UE does not report the measurements, and may delete the measurements. |
| 3.3 | Reporting probability factor | When a configured event occurs, the UE draws a random number. If the number is less (or, alternatively, more) than the reporting probability factor, the UE ignores the measurement configuration. Otherwise, the UE reports measurements to the network |
| 3.4 | Positioning capabilities | If the UE positioning capabilities do not match the indicated positioning capabilities, the UE does not report measurements to the network |

TABLE 1-continued

| IE No | IE Name | Explanation |
|---|---|---|
| 3.5 | Access classes | If the access class of the UE does not match the indicated access classes, the UE does not report measurements to the network. |
| 3.6 | Indoor | The value is set to enable or disable indoor filtering. If indoor filtering is enabled, the UE may not initiate RRC connection establishment if the UE detects it is operating indoors |
| 3.7 | Indoor transmission power | Indoor condition may be specified as transmission power of the base station. |
| 3.8 | Delete if not meeting reporting criteria | If configured, the UE deletes measurements taken since the corresponding activation if one or more reporting criteria are not satisfied |
| 4. | Location Request Criteria and Mode | If one or more criteria or all of the criteria shown below are satisfied the UE establishes RRC connection with indication of MDT positioning or initiates MO-LR procedure |
| 4.1 | Event identity (or event descriptor) | One or more of the following: No event if entering area specified in 1; Entering coverage area; Exceeding cell reselection thresholds; or at least one of the signal strength and quality become worse than thresholds. |
| 4.3 | Positioning probability factor | The threshold the UE compares with a random number the UE draws to decide whether it should establish an RRC connection for MDT, initiate a mobile originating location request etc. |
| 4.4 | Reporting range (upper and/or lower limits) | If the event identity (descriptor) is radio condition, the reporting range contains threshold values. If the event identity (descriptor) is entering coverage area, the reporting range contains duration of out of coverage. If the radio condition is worse than the thresholds or the duration of out of coverage is within the required range, the UE may initiate an RRC connection procedure or MO-LR. |
| 4.5 | Positioning capabilities | If the UE supports the specified positioning methods, the UE may initiate RRC connection procedure or location request |
| 4.6 | Indoor | The value is set to enable or disable indoor filtering. If indoor filtering is enabled, the UE may not initiate RRC connection establishment or MO-LR for MDT purpose if the UE detects it is operating indoors |
| 4.7 | Indoor transmission power | Indoor condition may be specified in transmission power of the base station. If the transmission power of the base station indicated in the system information is lower than this value, the UE may not initiate RRC connection procedure or MO-LR for MDT purpose. |
| 4.8 | Positioning request mode | One or more of "MO-LR for assistance data", "MO-LR for positioning measurement" and "RRC connection establishment" |
| 5. | Positioning Measurement Configuration | |
| 5.1 | Positioning measurement | Measurement control information for positioning. Positioning methods, neighboring cells, QoS, periodicity of measurements, Validity (idle, CELL_PCH or URA_PCH state, going out of coverage, coming back to coverage, etc) |
| 5.2 | Assistance data | For example, Ephemeris and timing correction information of the visible satellites for GPS/GNSS |
| 5.3 | Validity of assistance data | The area where the assistance data is valid. The area may be specified as a list of cells, URAs. Default is the serving cell or the camped on cell. |
| 6. | Reporting Reporting mode | Immediate or recording. Default is immediate or recording. |

The following are some examples of using the MDT IEs in Table 1 to configure MDT measurements in the 3GPP communication system 100.

Example 1

For detecting idle mode coverage problems, the broadcast system information can include MDT IEs 2.1.2 (Activating threshold going out of coverage) or 2.1.3 (Activating threshold back to coverage) as an activation condition for MDT measurement and logging. Additionally, the system information can include MDT IEs 2.2.2 (Deactivating Threshold going out of coverage), 2.2.3 (Deactivating threshold back to coverage) and 2.2.7 (Duration of measurement and logging) as deactivation conditions for measurement and logging. The system information can also contain MDT IE 2.2.7 (Duration of measurement and logging) to limit the number of UEs performing MDT measurement and logging. The MDT IEs 3.1 (Event identity), 3.2 (Reporting range as valid out of coverage duration) and 3.3 (Reporting probability factor) may be included for reporting. As an illustrative example, MDT IE 3.1 (Event identity) may be set to out of coverage or limited camping, and MDT IE 3.2 (Reporting range as valid out of coverage duration) may be set to 3 to 10 minutes.

Example 2

For detecting idle mode mobility problems, the system information can include MDT IEs 2.1.4 (Threshold for excessive intra frequency cell reselections), 2.1.5 (Threshold for excessive inter frequency cell reselections) or 2.1.6 (Threshold for excessive inter RAT frequency cell reselections) as triggering condition for MDT measurement and logging. The system information can include MDT IE 2.2.7 (Duration of measurement and logging) to limit the number of UEs performing MDT measurement and logging. The system information can also include MDT IEs 4.1 (Event identity), 4.3 (Positioning probability factor) and 4.8 (Positioning request mode) to acquire location information for the problem area. In an illustrative example, MDT IE 4.1 (Event identity) may be set to exceeding cell reselection threshold and MDT IE 4.8 (Positioning request mode) may be set to MO-LR (positioning measurement).

Example 3

When a problematic area has been identified, the system information may contain MDT IE 2.1.1 (Target area), and MDT IE 4.1 (Event identity) can be configured to "entering the specified area" with an appropriate probability factor (MDT IE 4.3 (Positioning probability factor)) and an appropriate signal strength threshold (MDT IE 4.4 (Reporting range)). MDT IE 4.8 (Positioning request mode) can be set to "RRC connection establishment." When the UE establishes the RRC connection, the network can use an RRC connection reconfiguration message to configure the MDT measurement and logging. For example, the message can include MDT IE 5.2 (Assistance data) to deliver assistance data.

Example 4

System information can include MDT IE 2, MDT IE 4.1 (Event identity) set to entering coverage area, MDT IE 4.3 (Positioning probability factor), MDT IE 4.4 (Reporting range) set to 3 to 10 minutes, and MDT IE 4.8 (Positioning request mode) set to MO-LR (positioning measurement). When the UE finds a suitable cell, the UE may initiate MO-LR request.

Figure 22:
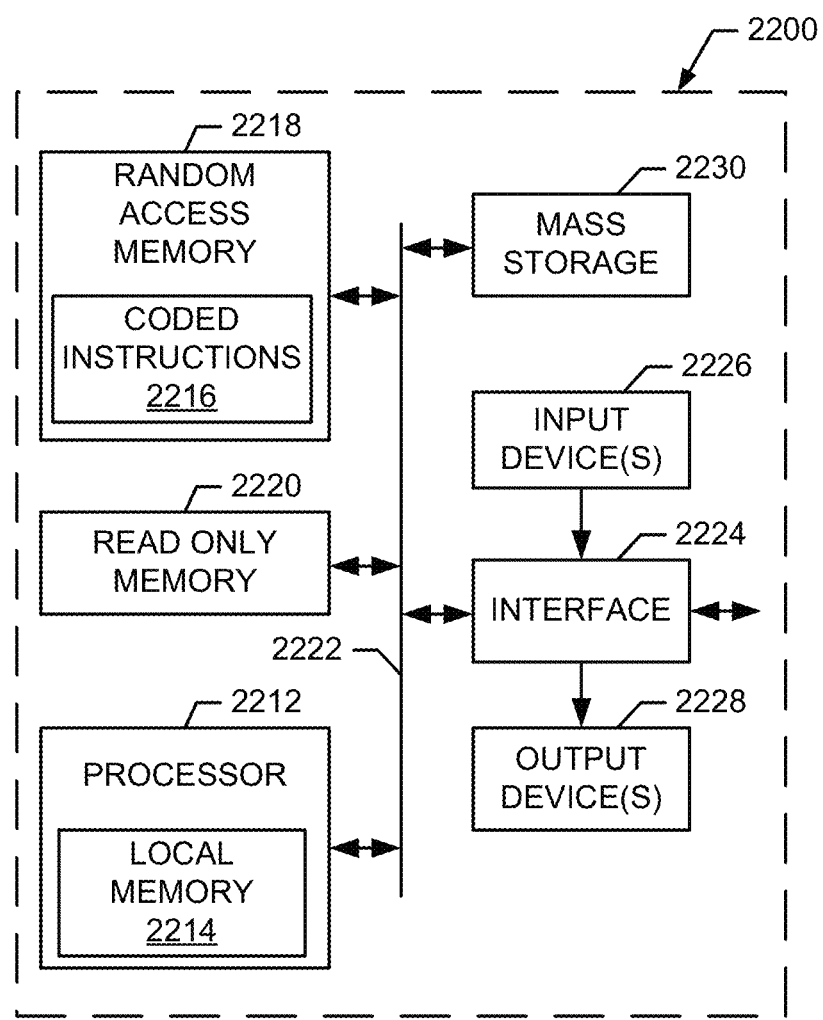
FIG. 22 is a block diagram of an example processing system that may execute example machine readable instructions used to implement some or all of the processes of FIGS. 6, 7, 8A-B, 10-15, and 17-21 to implement any, some or all of the UE of FIG. 4, the network element of FIG. 5 and the 3GPP communication system of FIG. 1.

FIG. 22 is a block diagram of an example processing system 2200 capable of implementing the apparatus and methods disclosed herein. The processing system 2200 can be, for example, a server, a personal computer, a personal digital assistant (PDA), a smartphone, an Internet appliance, or any other type of computing device.

The system 2200 of the instant example includes a processor 2212 such as a general purpose programmable processor. The processor 2212 includes a local memory 2214, and executes coded instructions 2216 present in the local memory 2214 and/or in another memory device. The processor 2212 may execute, among other things, machine readable instructions to implement the processes represented in FIGS. 6, 7, 8A-B, 10-15, and 17-21. The processor 2212 may be any type of processing unit, such as one or more microprocessors from the Intel® Centrino® family of microprocessors, the Intel® Pentium® family of microprocessors, the Intel® Itanium® family of microprocessors, and/or the Intel XScale® family of processors, one or more microcontrollers from the ARM® family of microcontrollers, the PIC® family of microcontrollers, etc. Of course, other processors from other families are also appropriate.

The processor 2212 is in communication with a main memory including a volatile memory 2218 and a non-volatile memory 2220 via a bus 2222. The volatile memory 2218 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 2220 may be implemented by flash memory and/or any other desired type of memory device. Access to the main memory 2218, 2220 is typically controlled by a memory controller (not shown).

The processing system 2200 also includes an interface circuit 2224. The interface circuit 2224 may be implemented by any type of interface standard, such as an Ethernet interface, a universal serial bus (USB), and/or a third generation input/output (3GIO) interface.

One or more input devices 2226 are connected to the interface circuit 2224. The input device(s) 2226 permit a user to enter data and commands into the processor 2212. The input device(s) can be implemented by, for example, a keyboard, a mouse, a touchscreen, a track-pad, a trackball, an isopoint and/or a voice recognition system.

One or more output devices 2228 are also connected to the interface circuit 2224. The output devices 2228 can be implemented, for example, by display devices (e.g., a liquid crystal display, a cathode ray tube display (CRT)), by a printer and/or by speakers. The interface circuit 2224, thus, typically includes a graphics driver card.

The interface circuit 2224 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The processing system 2200 also includes one or more mass storage devices 2230 for storing software and data. Examples of such mass storage devices 2230 include floppy disk drives, hard drive disks, compact disk drives and digital versatile disk (DVD) drives.

As an alternative to implementing the methods and/or apparatus described herein in a system such as the processing system of FIG. 22, the methods and or apparatus described herein may be embedded in a structure such as a processor and/or an ASIC (application specific integrated circuit).

Finally, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method for a user equipment (UE) to perform measurements, the method comprising:
receiving configuration information from a network, the configuration information to configure the UE to perform logging of measurements, the configuration information including:
a first activation threshold specifying a first number of reselections of a first type, and a second activation threshold specifying a second number of reselections of a second type different from the first type, the UE to activate the logging of measurements when at least one of the first activation threshold or the second activation threshold is exceeded during a first time period; and a deactivation condition that is to cause the UE to stop the logging of measurements activated based on at least one of the first activation threshold or the second activation threshold; and storing the configuration information at the UE.

2. A method as defined in claim 1 wherein the configuration information is received while the UE is in a connected mode.

3. A method as defined in claim 2 wherein the connected mode is a radio resource control (RRC) connected mode.

4. A method as defined in claim 3 wherein the RRC connected mode is associated with at least one of a universal terrestrial radio access network (UTRAN) or an evolved-UTRAN (E-UTRAN).

5. A method as defined in claim 1 wherein the configuration information is received from the network via an RRC message.

6. A method as defined in claim 1 further comprising performing logging of measurements while the UE is in an idle mode in accordance with the stored configuration information.

7. A method as defined in claim 1 wherein the configuration information further includes area information specifying an area in which the UE is to perform the logging of measurements, and further comprising performing the logging of measurements only when the UE is in the area specified by the area information.

8. A method as defined in claim 1 wherein the deactivation condition includes a deactivation threshold specifying a third number of reselections that, when not exceeded by the UE during a second time period, is to cause the UE to stop the logging of measurements.

9. A method as defined in claim 1 wherein the deactivation condition includes a duration that, when expired, is to cause the UE to stop the logging of measurements.

10. A tangible machine readable storage device or storage disk comprising machine readable instructions which, when executed, cause a machine to at least:

receive configuration information from a network, the configuration information to configure a user equipment (UE) to perform logging of measurements, the configuration information including:

a first activation threshold specifying a first number of reselections of a first type, and a second activation threshold specifying a second number of reselections of a second type different from the first type, the UE to activate the logging of measurements when at least one of the first activation threshold or the second activation threshold is exceeded by the UE during a first time period; and a deactivation condition that is to cause the UE to stop the logging of measurements activated based on at least one of the first activation threshold or the second activation threshold; and store the configuration information at the UE.

11. A tangible machine readable storage device or storage disk as defined in claim 10 wherein the configuration information is received while the UE is in a connected mode.

12. A tangible machine readable storage device or storage disk as defined in claim 11 wherein the connected mode is a radio resource control (RRC) connected mode.

13. A tangible machine readable storage device or storage disk as defined in claim 12 wherein the RRC connected mode is associated with at least one of a universal terrestrial radio access network (UTRAN) or an evolved-UTRAN (E-UTRAN).

14. A tangible machine readable storage device or storage disk as defined in claim 10 wherein the machine readable instructions, when executed, further cause the machine to perform logging of measurements while the UE is in an idle mode in accordance with the stored configuration information.

15. A tangible machine readable storage device or storage disk as defined in claim 10 wherein the configuration information further includes area information specifying an area in which the UE is to perform the logging of measurements, and the machine readable instructions, when executed, further cause the machine to perform the logging of measurements only when the UE is in the area specified by the area information.

16. A tangible machine readable storage device or storage disk as defined in claim 10 wherein the deactivation condition includes a deactivation threshold specifying a third number of reselections that, when not exceeded by the UE during a second time period, is to cause the UE to stop the logging of measurements.

17. A tangible machine readable device or storage disk as defined in claim 10 wherein the configuration information is received from the network via an RRC message.

18. A tangible machine readable storage device or storage disk as defined in claim 10 wherein the deactivation condition includes a duration that, when expired, is to cause the UE to stop the logging of measurements.

19. An apparatus to perform measurements, the apparatus comprising:

a processor configured to:

receive configuration information from a network, the configuration information to configure a user equipment (UE) to perform logging of measurements, the configuration information including:

a first activation threshold specifying a first number of reselections of a first type, and a second activation threshold specifying a second number of reselections of a second type different from the first type, the UE to activate the logging of measurements when at least one of the first activation threshold or the second activation threshold is exceeded by the UE during a first time period; and a deactivation condition that is to cause the UE to stop the logging of measurements activated based on at least one of the first activation threshold or the second activation threshold; and store the configuration information at the UE.

20. An apparatus as defined in claim 19 wherein the configuration information is received while the UE is in a connected mode.

21. An apparatus as defined in claim 20 wherein the connected mode is a radio resource control (RRC) connected mode.

22. An apparatus as defined in claim 21 wherein the RRC connected mode is associated with at least one of a universal terrestrial radio access network (UTRAN) or an evolved-UTRAN (E-UTRAN).

23. An apparatus as defined in claim 19 wherein the processor is configured to perform logging of measurements while the UE is in an idle mode in accordance with the stored configuration information.

24. An apparatus as defined in claim 19 wherein the configuration information further includes area information specifying an area in which the UE is to perform the logging of measurements, and the processor is further configured to perform the logging of measurements only when the UE is in the area specified by the area information.

25. An apparatus as defined in claim 19 wherein the deactivation condition includes a deactivation threshold specifying a third number of reselections that, when not exceeded by the UE during a second time period, is to cause the UE to stop the logging of measurements.

26. An apparatus as defined in claim 19 wherein the configuration information is received from the network via an RRC message.

27. An apparatus as defined in claim 19 wherein the deactivation condition includes a duration that, when expired, is to cause the UE to stop the logging of measurements.

28. A method comprising:
sending configuration information to a user equipment (UE), the configuration information to configure the UE to perform logging of measurements, the configuration information including:
a first activation threshold specifying a first number of reselections of a first type that, when exceeded by the UE during a first time period, is to cause the UE to activate the logging of measurements;
a second activation threshold specifying a second number of reselections of a second type different from the first type that, when exceeded by the UE during the first time period, is to also cause the UE to activate the logging of measurements; and
a deactivation condition that is to cause the UE to stop the logging of measurements activated based on at least one of the first activation threshold or the second activation threshold; and
receiving logged measurements from the UE in accordance with the configuration information.

29. A method as defined in claim 28 wherein the configuration information further includes area information specifying an area in which the UE is to perform the logging of measurements.

30. A method as defined in claim 28 wherein the deactivation condition includes a deactivation threshold specifying a third number of reselections that, when not exceeded by the UE during a second time period, is to cause the UE to stop the logging of measurements.

31. A method as defined in claim 28 wherein the configuration information is sent while the UE is in a connected mode.

32. A method as defined in claim 31 wherein the connected mode is a radio resource control (RRC) connected mode.

33. A method as defined in claim 32 wherein the RRC connected mode is associated with at least one of a universal terrestrial radio access network (UTRAN) or an evolved-UTRAN (E-UTRAN).

34. A method as defined in claim 28 wherein the deactivation condition includes a duration that, when expired, is to cause the UE to stop the logging of measurements.

35. A tangible machine readable storage device or storage disk comprising machine readable instructions which, when executed, cause a machine to at least:
send configuration information to a user equipment (UE), the configuration information to configure the UE to perform logging of measurements, the configuration information including:
a first activation threshold specifying a first number of reselections of a first type that, when exceeded by the UE during a first time period, is to cause the UE to activate the logging of measurements;
a second activation threshold specifying a second number of reselections of a second type different from the first type that, when exceeded by the UE during the first time period, is to also cause the UE to activate the logging of measurements; and
a deactivation condition that is to cause the UE to stop the logging of measurements activated based on at least one of the first activation threshold or the second activation threshold; and
receive logged measurements from the UE in accordance with the configuration information.

36. A tangible machine readable storage device or storage disk as defined in claim 35 wherein the configuration information further includes area information specifying an area in which the UE is to perform the logging of measurements.

37. A tangible machine readable storage device or storage disk as defined in claim 35 wherein the deactivation condition includes a deactivation threshold specifying a third number of reselections that, when not exceeded by the UE during a second time period, is to cause the UE to stop the logging of measurements.

38. A tangible machine readable storage device or storage disk as defined in claim 35 wherein the configuration information is sent while the UE is in a connected mode.

39. A tangible machine readable storage device or storage disk as defined in claim 38 wherein the connected mode is a radio resource control (RRC) connected mode.

40. A tangible machine readable storage device or storage disk as defined in claim 39 wherein the RRC connected mode is associated with at least one of a universal terrestrial radio access network (UTRAN) or an evolved-UTRAN (E-UTRAN).

41. A tangible machine readable storage device or storage disk as defined in claim 35 wherein the deactivation condition includes a duration that, when expired, is to cause the UE to stop the logging of measurements.

42. An apparatus comprising:
a processor configured to:
send configuration information to a user equipment (UE), the configuration information to configure the UE to perform logging of measurements, the configuration information including:
a first activation threshold specifying a first number of reselections of a first type that, when exceeded by the UE during a first time period, is to cause the UE to activate the logging of measurements;
a second activation threshold specifying a second number of reselections of a second type different from the first type that, when exceeded by the UE during the first time period, is to also cause the UE to activate the logging of measurements; and
a deactivation condition that is to cause the UE to stop the logging of measurements activated based on at least one of the first activation threshold or the second activation threshold; and
receive logged measurements from the UE in accordance with the configuration information.

43. An apparatus as defined in claim 42 wherein the configuration information further includes area information specifying an area in which the UE is to perform the logging of measurements.

44. An apparatus as defined in claim 42 wherein the deactivation condition includes a deactivation threshold specifying a third number of reselections that, when not exceeded by the UE during a second time period, is to cause the UE to stop the logging of measurements.

45. An apparatus as defined in claim 42 wherein the configuration information is sent while the UE is in a connected mode.

46. An apparatus as defined in claim 45 wherein the connected mode is a radio resource control (RRC) connected mode.

47. An apparatus as defined in claim 46 wherein the RRC connected mode is associated with at least one of a universal terrestrial radio access network (UTRAN) or an evolved-UTRAN (E-UTRAN).

48. An apparatus as defined in claim 42 wherein the deactivation condition includes a duration that, when expired, is to cause the UE to stop the logging of measurements.

\* \* \* \* \*

UNITED STATES PATENT AND TRADEMARK OFFICE
CERTIFICATE OF CORRECTION

| | | |
|---|---|---|
| PATENT NO. | : 9,220,028 B2 | Page 1 of 1 |
| APPLICATION NO. | : 12/705243 | |
| DATED | : December 22, 2015 | |
| INVENTOR(S) | : Takashi Suzuki et al. | |

It is certified that error appears in the above-identified patent and that said Letters Patent is hereby corrected as shown below:

IN THE CLAIMS

Column 38, Line 24, In Claim 17, after "readable" insert -- storage --.

Signed and Sealed this
Third Day of May, 2016

Michelle K. Lee
*Director of the United States Patent and Trademark Office*